(12) United States Patent
Wang et al.

(10) Patent No.: US 9,930,560 B2
(45) Date of Patent: Mar. 27, 2018

(54) METHODS FOR MANAGING A BROADBAND CONNECTION USING A NARROWBAND CONNECTION

(71) Applicant: MOTOROLA SOLUTIONS, INC, Schaumburg, IL (US)

(72) Inventors: Xing Wang, Chengdu (CN); Jiang-Qiang Luo, Chengdu (CN); Jian-Long Tan, Chengdu (CN); Jack Wong, Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 32 days.

(21) Appl. No.: 14/914,002

(22) PCT Filed: Oct. 23, 2013

(86) PCT No.: PCT/CN2013/085811
§ 371 (c)(1),
(2) Date: Feb. 24, 2016

(87) PCT Pub. No.: WO2015/058374
PCT Pub. Date: Apr. 30, 2015

(65) Prior Publication Data
US 2016/0234711 A1    Aug. 11, 2016

(51) Int. Cl.
*H04W 28/02* (2009.01)
*H04L 12/859* (2013.01)
(Continued)

(52) U.S. Cl.
CPC ..... *H04W 28/0215* (2013.01); *H04L 47/2475* (2013.01); *H04L 61/2592* (2013.01);
(Continued)

(58) Field of Classification Search
CPC ............ H04W 28/0215; H04W 84/12; H04W 76/022; H04W 48/18; H04W 48/16;
(Continued)

(56) References Cited

U.S. PATENT DOCUMENTS

| 5,805,682 A | 9/1998 | Voit et al. |
| 6,199,205 B1 | 3/2001 | Chopping |

(Continued)

FOREIGN PATENT DOCUMENTS

| CA | 2254821 A1 | 6/1999 |
| CA | 2283369 A1 | 3/2001 |

(Continued)

OTHER PUBLICATIONS

English Translation of CN1588977A. Mar. 2, 2005, [retrieved on Jul. 13, 2017]. Retrieved from the Internet: <URL: https://www.google.com/patents/CN1588977A?cl=en>. pp. 1-11.*

(Continued)

*Primary Examiner* — Omar J Ghowrwal

(57) ABSTRACT

A method, apparatus, and system for application controlled network selection between a broadband network and a narrowband network include operating an application with an end device with a narrowband connection to the end device; acquiring a source broadband connection comprising a source broadband network address; negotiating a peer-to-peer broadband connection with the end device utilizing the narrowband connection to communicate the source broadband network address; utilizing the peer-to-peer broadband connection for data associated with the application responsive to successful negotiating; and managing the peer-to-peer broadband connection using the narrowband connection as a control channel therefor. The narrowband (Continued)

connection can include Digital Mobile Radio (DMR), Land Mobile Radio (LMR), Project 25 (P25), Terrestrial Trunked Radio (TETRA), or the like.

11 Claims, 21 Drawing Sheets

(51) Int. Cl.
| | | |
|---|---|---|
| H04L 29/08 | (2006.01) | |
| H04L 29/12 | (2006.01) | |
| H04W 84/12 | (2009.01) | |
| H04W 76/02 | (2009.01) | |
| H04W 48/18 | (2009.01) | |
| H04W 48/16 | (2009.01) | |

(52) U.S. Cl.
CPC ......... *H04L 67/1063* (2013.01); *H04W 48/18* (2013.01); *H04W 76/022* (2013.01); *H04W 84/12* (2013.01); *H04L 61/256* (2013.01); *H04L 61/2514* (2013.01); *H04L 61/2553* (2013.01); *H04W 48/16* (2013.01)

(58) Field of Classification Search
CPC ............. H04L 47/2475; H04L 67/1063; H04L 61/2592; H04L 61/2514; H04L 61/256; H04L 61/2553
See application file for complete search history.

(56) References Cited

U.S. PATENT DOCUMENTS

| | | | |
|---|---|---|---|
| 6,282,575 | B1 | 8/2001 | Lin et al. |
| 6,526,034 | B1 | 2/2003 | Gorsuch |
| 6,683,877 | B1 | 1/2004 | Gibbs et al. |
| 6,909,705 | B1 | 6/2005 | Lee et al. |
| 6,987,985 | B2 | 1/2006 | Purkayastha et al. |
| 7,409,451 | B1 | 8/2008 | Meenan et al. |
| 8,223,677 | B2 | 7/2012 | McCamon |
| 8,249,016 | B1 | 8/2012 | Kalbag et al. |
| 2003/0224795 | A1 | 12/2003 | Wilhoite et al. |
| 2006/0135200 | A1 | 6/2006 | Yun et al. |
| 2006/0276192 | A1 | 12/2006 | Dutta et al. |
| 2007/0127415 | A1 | 6/2007 | Spear |
| 2007/0147391 | A1 | 6/2007 | Wilhoite et al. |
| 2007/0220092 | A1 | 9/2007 | Heitzeberg et al. |
| 2008/0037517 | A1 | 2/2008 | Emborg |
| 2009/0034471 | A1 | 2/2009 | Rosenblatt |
| 2009/0113059 | A1 | 4/2009 | Logalbo et al. |
| 2009/0167600 | A1* | 7/2009 | Son .................. H04W 8/245 |
| | | | 342/357.55 |
| 2009/0280810 | A1 | 11/2009 | Mahdi et al. |
| 2010/0272060 | A1 | 10/2010 | Junela et al. |
| 2011/0044334 | A1* | 2/2011 | Miyashita ............... H04L 63/08 |
| | | | 370/389 |
| 2011/0080867 | A1* | 4/2011 | Mildh .................. H04W 76/02 |
| | | | 370/328 |
| 2011/0237287 | A1* | 9/2011 | Klein ................ H04M 3/42178 |
| | | | 455/521 |
| 2012/0051321 | A1 | 3/2012 | De et al. |
| 2012/0294173 | A1* | 11/2012 | Su ......................... H04W 24/10 |
| | | | 370/252 |
| 2014/0086209 | A1* | 3/2014 | Su ....................... H04W 76/026 |
| | | | 370/331 |
| 2017/0180198 | A1* | 6/2017 | Baum ................ H04L 41/0806 |

FOREIGN PATENT DOCUMENTS

| | | | |
|---|---|---|---|
| CN | 1588977 A | * | 3/2005 |
| EP | 719062 A2 | | 6/1996 |
| EP | 907303 A2 | | 4/1999 |
| EP | 1603352 A1 | | 12/2005 |
| GB | 2333204 A1 | | 7/1999 |
| WO | 1999048315 A1 | | 9/1999 |
| WO | 2002096132 A1 | | 11/2002 |
| WO | 2005002250 A1 | | 1/2005 |
| WO | 2006020168 A2 | | 2/2006 |
| WO | 2007140582 A1 | | 12/2007 |

OTHER PUBLICATIONS

International Search Report and Written Opinion, PCT/CN2013/085811, dated: Oct. 23, 2013, CM16432, all pages.

* cited by examiner

METHODS FOR MANAGING A BROADBAND CONNECTION USING A NARROWBAND CONNECTION

This application is a National Stage filing under 35 USC § 371 of co-pending Patent Cooperation Treaty international application having Serial No. PCT/CN2013/085811 (the 'PCT international application') filed on Oct. 23, 2013. This application claims priority to the PCT international application, the entire contents of which are incorporated herein by reference.

BACKGROUND OF THE INVENTION

The present disclosure relates generally to wireless networking. Digital mobile radio (DMR) is an open digital radio standard which is a two-slot, time division multiple access (TDMA) system offering voice, data, and a range of other features and applications. DMR covers the Radio frequency (RF) range of 30 MHz to 1 GHz and uses Frequency shift keying (FSK) constant envelope modulation. However, DMR has bandwidth limitations making it hard to accommodate high-bandwidth data applications. WI-FI technology (e.g., IEEE 802.11 and variants thereof, hereinafter, "Wi-Fi") is potentially applied to radio products (e.g., repeater and subscriber units) coexisting with DMR, but it also includes limitations. Wi-Fi allows a device to exchange data wirelessly over a network, including high-speed Internet connections. The Wi-Fi Alliance defines Wi-Fi as any wireless local area network (WLAN) products that are based on the Institute of Electrical and Electronics Engineers' (IEEE) 802.11 standards. Continuous Wi-Fi operation leads to battery life concerns in radios. Additionally, external Internet Protocol (IP) addresses and ports assigned by a Wi-Fi access point (AP) can be unknown to the radio due to Wireless local area network (WLAN) router/firewall traversal. Further, when the radio moves between APs, the mobility and addressing is unknown to remote end devices.

Broadband networks can include Wi-Fi technology (e.g., IEEE 802.11 and variants thereof), Bluetooth, WiMAX, 3G, Long Term Evolution (LTE), or the like. For example, Wi-Fi technology is potentially applied to radio products (e.g., repeater and subscriber units) coexisting with DMR, but it also includes limitations. Wi-Fi allows a device to exchange data wirelessly over a network, including high-speed Internet connections. The Wi-Fi Alliance defines Wi-Fi as any wireless local area network (WLAN) products that are based on the Institute of Electrical and Electronics Engineers' (IEEE) 802.11 standards. Continuous Wi-Fi operation leads to battery life concerns in radios. Additionally, external Internet Protocol (IP) addresses and ports assigned by a Wi-Fi access point (AP) can be unknown to the radio due to Wireless local area network (WLAN) router/firewall traversal. Further, when the radio moves between APs, the mobility and addressing is unknown to remote end devices.

Thus, it is a challenge to converge broadband networks (e.g., Wi-Fi) effectively with narrowband networks such as DMR, because typically an end device is mobile and its coverage to a broadband network may be sporadic. In addition, it is desired that different applications running on that end device are able to select different network service per its Quality of Service (QoS) needs. In conventional DMR radios, all over-the-air (OTA) applications are over DMR. With integration of Wi-Fi and other broadband techniques in radios along with DMR, there is a need for coordination of data traffic therebetween. Further, there exists no heterogeneous network handoff standard in DMR for interoperability.

Accordingly, there is a need for systems and methods for application controlled network selection between narrowband and broadband wireless networks.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
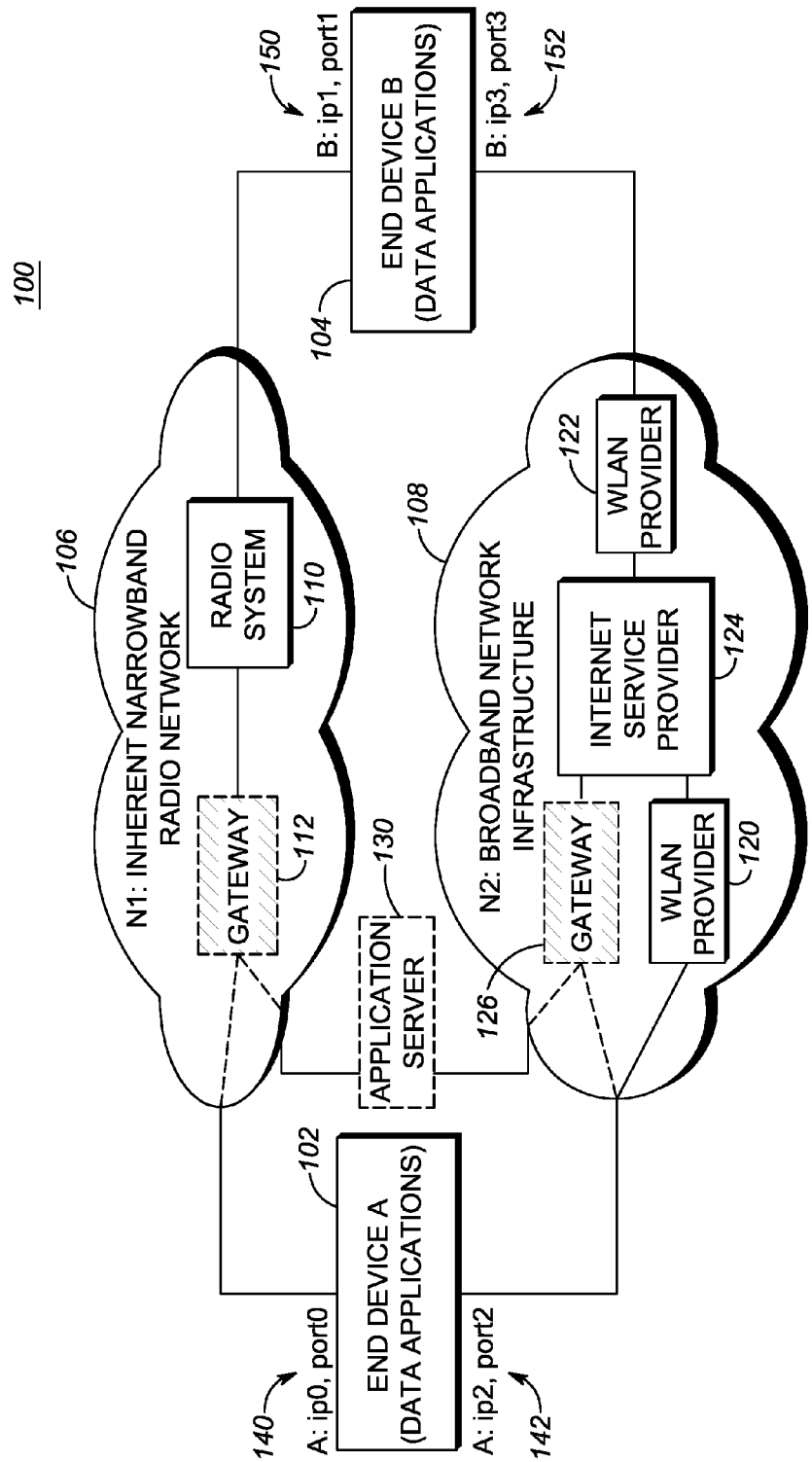
FIG. 1 is a network diagram of a network model with two end devices connected through two different networks in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In an exemplary embodiment, a method for application controlled network selection between a broadband network and a narrowband network includes operating an application with an end device with a narrowband connection to the end device; acquiring a source broadband connection comprising a source broadband network address; negotiating a peer-to-peer broadband connection with the end device utilizing the narrowband connection to communicate the source broadband network address; utilizing the peer-to-peer broadband connection for data associated with the application responsive to successful negotiating; and managing the peer-to-peer broadband connection using the narrowband connection as a control channel therefor.

In another exemplary embodiment, an apparatus for application controlled network selection between a broadband network and a narrowband network includes a narrowband network interface, a broadband network interface, and a processor communicatively coupled therebetween; memory storing instructions that, when executed, cause the processor to: operate an application with an end device with a narrowband connection to the end device over the narrowband network interface; acquire a source broadband connection comprising a source broadband network address of the broadband network interface; negotiate a peer-to-peer broadband connection with the end device utilizing the narrowband connection to communicate the source broadband network address; utilize the peer-to-peer broadband connection for data associated with the application responsive to successful negotiating; and manage the peer-to-peer broadband connection using the narrowband connection as a control channel therefor.

In yet another exemplary embodiment, a system for application controlled network selection between a broadband network and a narrowband network includes a first end device and a second end device each configured to operate over a narrowband network and a broadband network; a first application operating between the first end device and the second end device; wherein the first end device and the second end device are configured to: acquire a broadband connection on the broadband network comprising an associated broadband network address; negotiate a peer-to-peer broadband connection therebetween utilizing a narrowband connection on the narrowband network to communicate the associated broadband network address; utilize the peer-to-peer broadband connection for data associated with the first application responsive to successful negotiating; and manage the peer-to-peer broadband connection using the narrowband connection as a control channel therefor.

In various exemplary embodiments, systems and methods for application controlled network selection between narrowband and broadband wireless networks are described. The systems and methods include seamless, end-to-end mechanisms to select a logical channel for a particular application of end device, where the logical channel is based on a heterogeneous IP network service, e.g. a narrowband (NB) connection and a broadband (BB) connection. The traditional narrowband connection in radio system is engaged as control channel to activate and manage the broadband connection between two or more end devices. Both the broadband and narrowband connection can be active at the same time and can serve as traffic channel, it is up to each application to decide which channel to use based on its inherent characteristics. A presence notifier (PN) server can be enhanced to manage a device's broadband connection presence and address by collaborating through the narrowband connection.

In an exemplary embodiment, the systems and methods dynamically switch a Radio DMR data communication channel to a higher data bandwidth, Radio-equipped IP data network (e.g. Wi-Fi) communication channel. When the DMR data communication is offloaded to the alternative IP network, its unused data bandwidth could be used for voice communication thus increasing system capacity support. Also, being able to use the higher data bandwidth IP network, the data communication throughput speed is increased significantly over conventional DMR. Thus, it provides more effective and feasible method to the radio for supporting the higher data intensive applications (e.g. OTAP Firmware, Multimedia, etc.). The DMR data communication channel is still maintained and used as a control channel and a possible backup traffic channel.

In an exemplary embodiment, a source device provides its source broadband public network address (assuming it acquired one locally) to a target device and inquires on a status of the target device's broadband connection, using a narrowband connection. If the source device did not acquire a broadband address, the narrowband connection is used for the data transfer. Upon reception of the source device's broadband network address and inquiry on the status of its broadband connection, the target device enables its broadband capability, acquires a broadband connection, and acquires its broadband network address.

The target device replies over the narrowband connection with a positive indication and its broadband network address if the broadband connection is established. The source and target device create a broadband connection through the broadband network using their now known source and target broadband network address. An IP Tunnel can be created so that applications can use the DMR IP Address. Data is then transferred on the broadband connection between source and target devices. The broadband connection between the source and target device either times out due to inactivity or is directly closed using a message on the narrowband connection, acting as a control channel for the broadband connection.

Variously, the systems and methods include end device control algorithms and handshake signaling among system entities. As a result, the application session shall not 'abort' during the selection procedure or operation regardless of problems with the broadband connection. The systems and methods include management of multiple active remote IP channels over heterogeneous networks (e.g. DMR and Wi-Fi) for device long distance communication with selection on a per application basis based on requirements. The remote radio Wi-Fi activation and control can be accomplished via the DMR Radio network as a control channel. Further, the systems and methods include automatic network switching between DMR and IP Network for end-to-end device data communication as required based on the application or the status of the broadband connection.

End device IP addressing/Port exchange can be accomplished through the PN Server for radio network management. Advantageously, the systems and methods are lower cost compared with other 'routing' based methods because they do not require significant changes between the end devices, i.e. at the AP, gateway, or application server. That is, the systems and methods reuse existing network investment without significant manufacturing costs or technical expertise, and avoid troublesome system deployment.

FIG. 1 is a network diagram of a network model 100 with two end devices 102, 104 connected through two different networks 106, 108 in accordance with some embodiments. The end devices 102, 104 can be access terminals, mobile devices, radios, repeaters, computers, smart phones, etc. In various exemplary embodiments described herein, the network 106 is a narrowband network and the network 108 is a broadband network. In an exemplary embodiment, the narrowband network 106 includes DMR Common Air Interface (CAI) and the broadband network 108 includes Wi-Fi (e.g., IEEE 802.11 and variants thereof) although other embodiments are also contemplated. For example, the narrowband network 106 can include, without limitation, LMR, P25, and TETRA, or the like, and the broadband network 108 can include, without limitation, Bluetooth, WiMAX, 3G, LTE, or the like.

In this exemplary network model 100, the narrowband network 106 includes a radio system 110 and optionally a gateway 112 connected to the radio system 110. The broadband network 108 includes WLAN providers 120, 122 communicatively coupled to an Internet service provider (ISP) 124. The broadband network 108 can also include a gateway 126 connected to the ISP 124. The gateways 112, 126 can also connect to an application server 130.

In the exemplary network model 100, the end device A 102 includes two connections 140, 142 which are defined by addresses and ports, for example. The connection 140 can be labeled ip0, port0 and connects the end device A 102 to the gateway 112 in the narrowband network 106. The second connection 142 can be labeled ip2, port2 and connects the end device A 102 to either the gateway 126 or the WLAN provider 120 in the broadband network 108. The end device B 104 also includes two connections 150, 152, again which are defined by addresses and ports, for example. The connection 150 can be labeled ip1, port1 and connects the end device B 104 to the radio system 110 in the narrowband network 106. The second connection 152 can be labeled ip3, port3 and connects the end device B 104 to the WLAN provider 122 in the broadband network 108. Of note, the connections 142, 152 in the broadband network 108 have the local source IP/port addresses subject to translation after general firewall traversal. One broadband channel proxy port on the connections 142, 152 can be engaged for multiple applications of the end devices 102, 104.

In the context of the network model 100 and the method and apparatus described herein, it is assumed that the end devices 102, 104 are both capable of operating on either of the networks 106, 108. For example, the end devices 102, 104 can be DMR and Wi-Fi capable and can connect to the Internet behind a firewall. In an exemplary embodiment, the application server 130 can be a presence notifier (PN) server. The application server 130 can have a static public IP address of a wide area network (WAN) so that each end device 102, 104 is able to post and exchange its external IP/port of WAN, i.e. values for the connections 142, 152.

Figure 2:
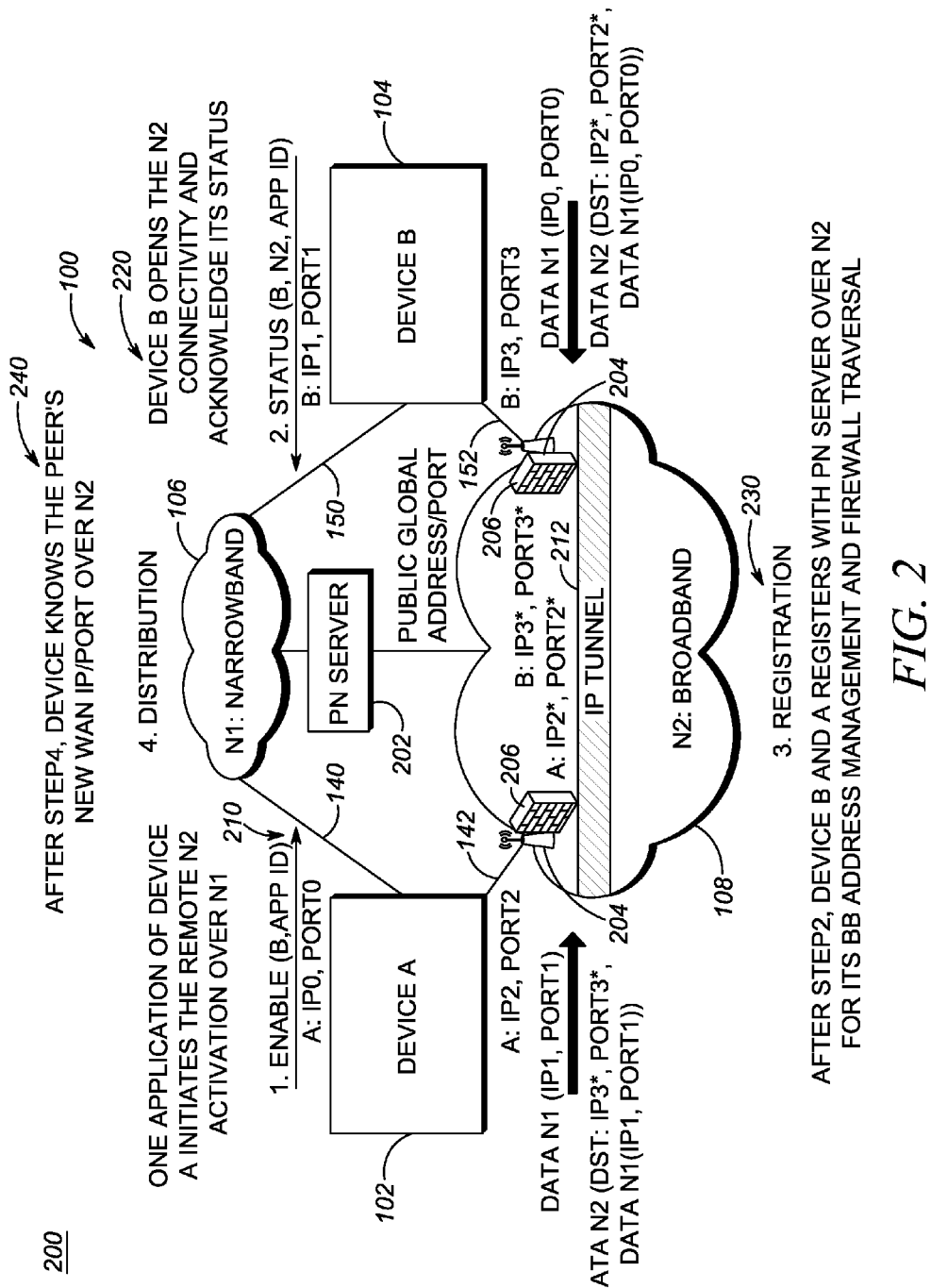
FIG. 2 is a network diagram of an exemplary operation in the network model illustrating the systems and methods in accordance with some embodiments.

FIG. 2 is a network diagram of an exemplary operation 200 in the network model 100 illustrating the systems and methods in accordance with some embodiments. FIG. 2 includes the same network model 100 as FIG. 1 and the application server 130 is a PN server 202 that is communicatively coupled to both the networks 106, 108. The broadband network 108 can include access points 204 and firewalls 206 which each connect to the devices 102, 104 via the connections 142, 154. Note, the connections 142, 152 can be on the same or different access points 204 and firewalls 206.

In various exemplary embodiments, systems and methods described herein utilize the narrowband network 106 (e.g. DMR) as a general control channel and the broadband network 108 as a first traffic channel candidate when available. High layer data applications still engage existing IP addressing schemes for broadband traffic over the broadband network 108, thus there is no impact on IP address change events across different networks or aborted active sessions for IP data transfer. For multiple applications running on one of the end devices 102, 104, each application can independently select between the networks 106, 108, if supported, to switch data transfer, or simply keep transfer on Wi-Fi channels, for example. The exemplary operation 200 provides an illustrative example of the systems and methods applied to the network model 100.

In an exemplary embodiment, each of the devices 102, 104 can periodically communicate presence and status information with the PN server 202. This can be done via either the networks 106, 108. The PN server 202 is configured to manage the connections 142, 152 for the devices 102, 104 based on presence and address information and based on collaborating with the connections 140, 150. The exemplary operation 200 includes one application of one of the devices 102, 104 initiating a remote activation of a connection 212 over the broadband network 108 (step 210). This remote activation is performed over the narrowband network 106 acting as a general control channel between the devices 102, 104. In the exemplary operation 200, for example, the device A 102 sends a message over the connection 140 through the narrowband network 106 such as enable (B, N2, App_id) where B is the device B 104, N2 is the broadband network 108, and the App_id includes the requiring application. This remote activation from the device A 102 is sent to the device B 104 and optionally to the PN server 202.

The device B 104 receives the remote activation message from the device A 102, opens the connection 152 based thereon, and acknowledges its status to the device A 102 (step 220). Here, the device B 104 configures the connection 152 to enable the requesting application to communicate over the broadband network 108 via the connection 212. The connection 212 can be an IP tunnel through the broadband network 108 (and other networks). The IP tunnel is used to transport another network protocol by encapsulation of its packets. IP tunnels are often used for connecting two disjoint IP networks that do not have a native routing path to each other, via an underlying routable protocol across an intermediate transport network. In conjunction with the IPSec protocol, they may be used to create a virtual private network between two or more private networks across a public network such as the Internet. In IP tunneling, every IP packet, including addressing information of its source and destination IP networks, is encapsulated within another packet format native to the transit network.

After the step 220, the devices 102, 104 can register with the PN server 202 over the broadband network 108 for address management and firewall traversal (step 230). Further, the registration with the PN server 202 can be continuously updated. Here, the devices 102, 104 provide the parameters of the connections 142, 152 to the PN server 202. The PN server 202 can distribute the connection 142, 152 to the devices 102, 104 so each device 102, 104 knows its peer's WAN IP/port address over the broadband network 108. Subsequently, data from the requesting application can be provided over the connection 212 through the broadband network 108. For example, after the broadband connection 212 is established, for the requesting application, an IP datagram that is supposed to be sent over the narrowband network 106 can be tunneled over the broadband network 108 instead, resulting in application transparency.

The device A 102, the requesting device in the exemplary operation 200, can control the IP tunnel marker for the requesting application through port mapping which is based on the handshake messages described herein. The device B 104 actively updates its availability in the broadband network 108 over the narrowband network 106 to the PN server 202. For example, the device B 104 can provide updates responsive to passively receiving a remote command, such as in the step 220, moving out of coverage in the broadband network 108 (e.g., AP coverage), moving in coverage in the broadband network 108 (e.g., AP coverage), and other external triggers (e.g., disabling of Wi-Fi on the device B 104).

In each of the end devices 102, 104 there is local processing therein to manage the associated connections 140, 142, 150, 152. A prioritized IP interface table can be maintained to serve a particular data application, such as, for example:

| Destination CAI IP address | Internal App Port | Candidate interface (priority) | BB Channel State |
|---|---|---|---|
| 12.0.0.1 | 4009 | N1: DMR (0) N2: Wi-Fi (1) | Disabled: local Wi-Fi is disconnected (initial state) Enabled: local Wi-Fi is connected Ready: remote BB channel is established Unavailable: BB channel transfer failure or firewall close exception |

In the aforementioned exemplary prioritized IP interface table, the destination CAI IP address is an address an application expects to send data to, such as over the narrowband network 106. The prioritized IP interface table also includes an internal application port, a candidate interface, and a BB (broadband) channel state. The systems and methods provide mapping data to the broadband network 108 in lieu of the narrowband network 106. The candidate interface is used to determine data mapping between the networks 106, 108, for example, N1: DMR is the narrowband network 106 and N2: Wi-Fi is the broadband network 108.

In an exemplary operation, a lowest priority is '0' allocated for N1:DMR. The initial state is 'Disabled'. Upon detecting the interface availability, such as in the exemplary operation 200, both the devices 102, 104 update their local table to trace the network status binding with a special port (4009 for App1). After a successful handshake of the devices 102, 104, the state is moved to 'Ready' and then subsequent IP datagrams targeted to 12.0.0.1 are tunneled over N2:Wi-Fi. The target device retrieves the original IP datagram and delivers to proper upper application. When N2 connectivity becomes unavailable, the peer device is informed through N1 and the above state is updated to recover corresponding DMR data channel. The IP tunneling is 'DEVICE' wide and engages one proxy port as source. If N2: Wi-Fi connectivity is 'Ready', another data application (e.g., App2) is able to reuse the IP tunneling established by adding a new 'port' item. When the tunnel inactivity timer expires, the local Wi-Fi connectivity can disconnect for battery saving.

Figure 3A:
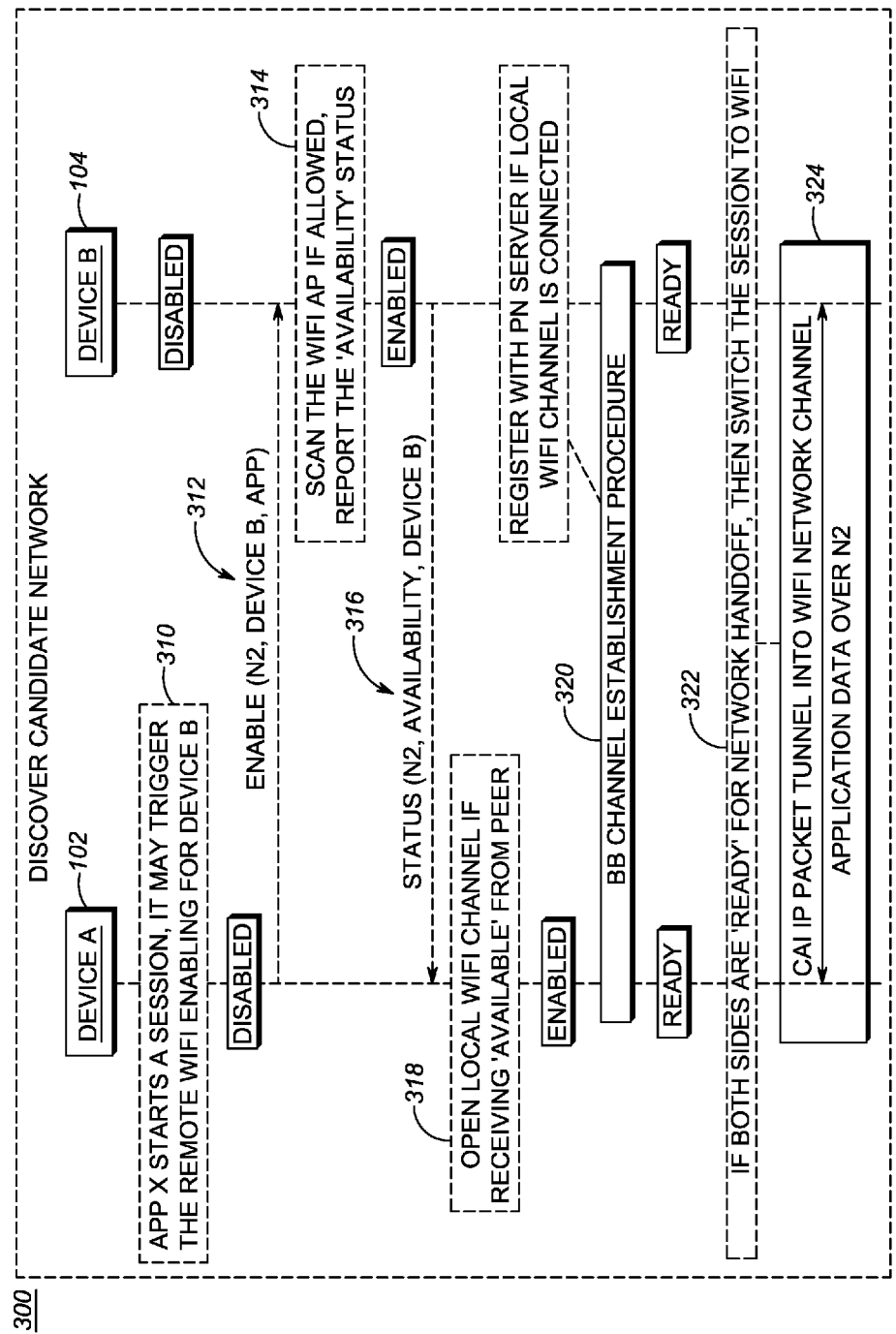
FIGS. 3A-3B are flow diagrams of a process of discovering candidate networks and a process of exiting candidate networks in accordance with some embodiments.
Figure 3B:
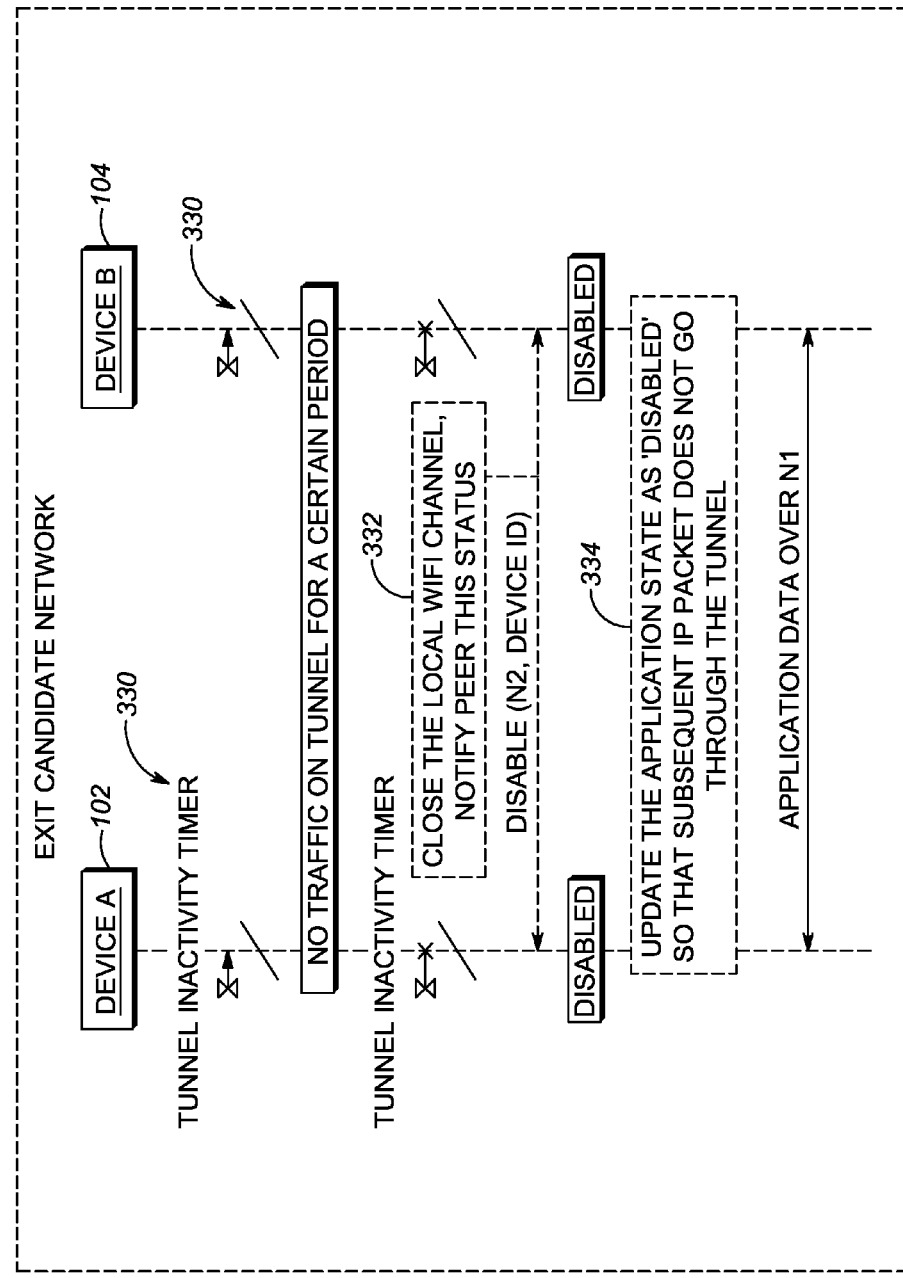

FIGS. 3A-3B are flow diagrams of a process 300 of discovering candidate networks and a process 302 of exiting candidate networks in accordance with some embodiments. The flow diagrams utilize the exemplary network model 100 and the devices 102, 104 for illustration. With respect to the process 300, the device A 102 is operating a requesting application (e.g., App X), and App X starts a session and may trigger remote Wi-Fi enabling for the device B 104 (step 310). At this point, the candidate network, i.e. the broadband network 108 is disabled on both the devices 102, 104, and the device A 102 sends an enable message to the device B 104 (step 312). Upon receipt of the enable message, the device B 104 scans the Wi-Fi AP, if allowed, and reports its availability status (step 314). Also, the device B 104 enables the Wi-Fi connection and send a status message to the device A 102 (step 316).

The device A 102 receives the status message and opens a local Wi-Fi channel responsive to the status message indicating such channel is available (step 318). Now, the Wi-Fi channel is enabled at both devices 102, 104, and a BB channel establishment procedure is performed (step 320) which includes registration with the PN server 202 if the local Wi-Fi channel is connected. Both of the devices are now ready for communication over the Wi-Fi channel, and the session can be switched to Wi-Fi (step 322). Finally, CAI IP packets are tunneled to the Wi-Fi channel by the devices 102, 104 (step 324).

With respect to the process 302, each of the devices 102, 104 can include a tunnel activity timer 330, and responsive to no activity on the tunnel (i.e., the Wi-Fi channel) for a certain period, one of the devices 102, 104 can close the local Wi-Fi channel and notify its peer of the status (step 332). For example, one of the devices 102, 104 can send a disable message to its peer. Here, the Wi-Fi channel is now disabled in both of the devices 102, 104. The devices 102, 104 update the application state to 'disabled' so that subsequent IP packets do not go through the tunnel (step 334). Subsequent IP packets (application data) now traverses over the narrowband network 106. Of course, if additional application data is required subsequent to the process 302, the devices 102, 104 can again implement the process 300 to reopen the Wi-Fi channel.

Figure 4A:
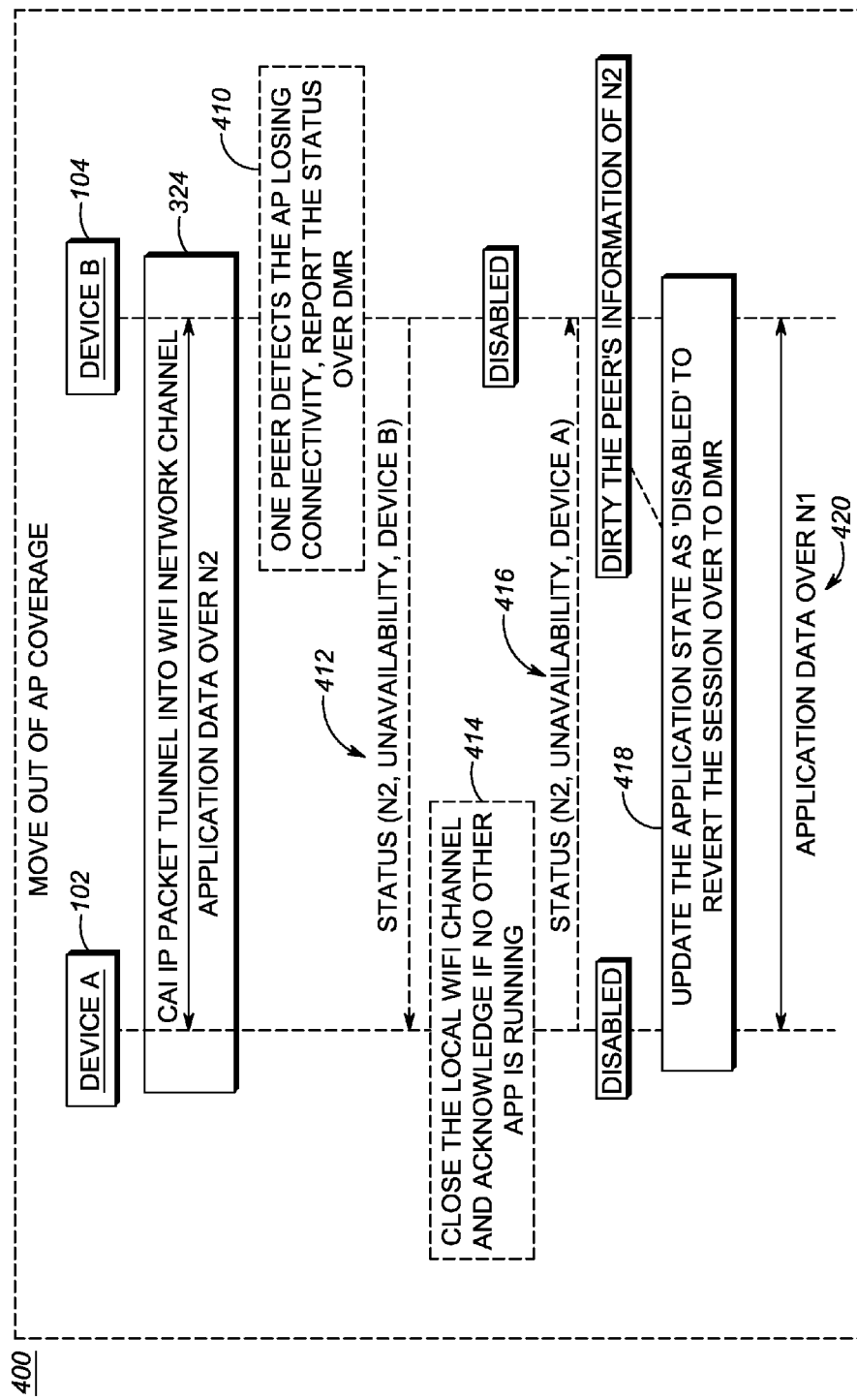
FIGS. 4A-4B are flow diagrams of a process of moving out of AP coverage and a process of moving in AP coverage in accordance with some embodiments.
Figure 4B:
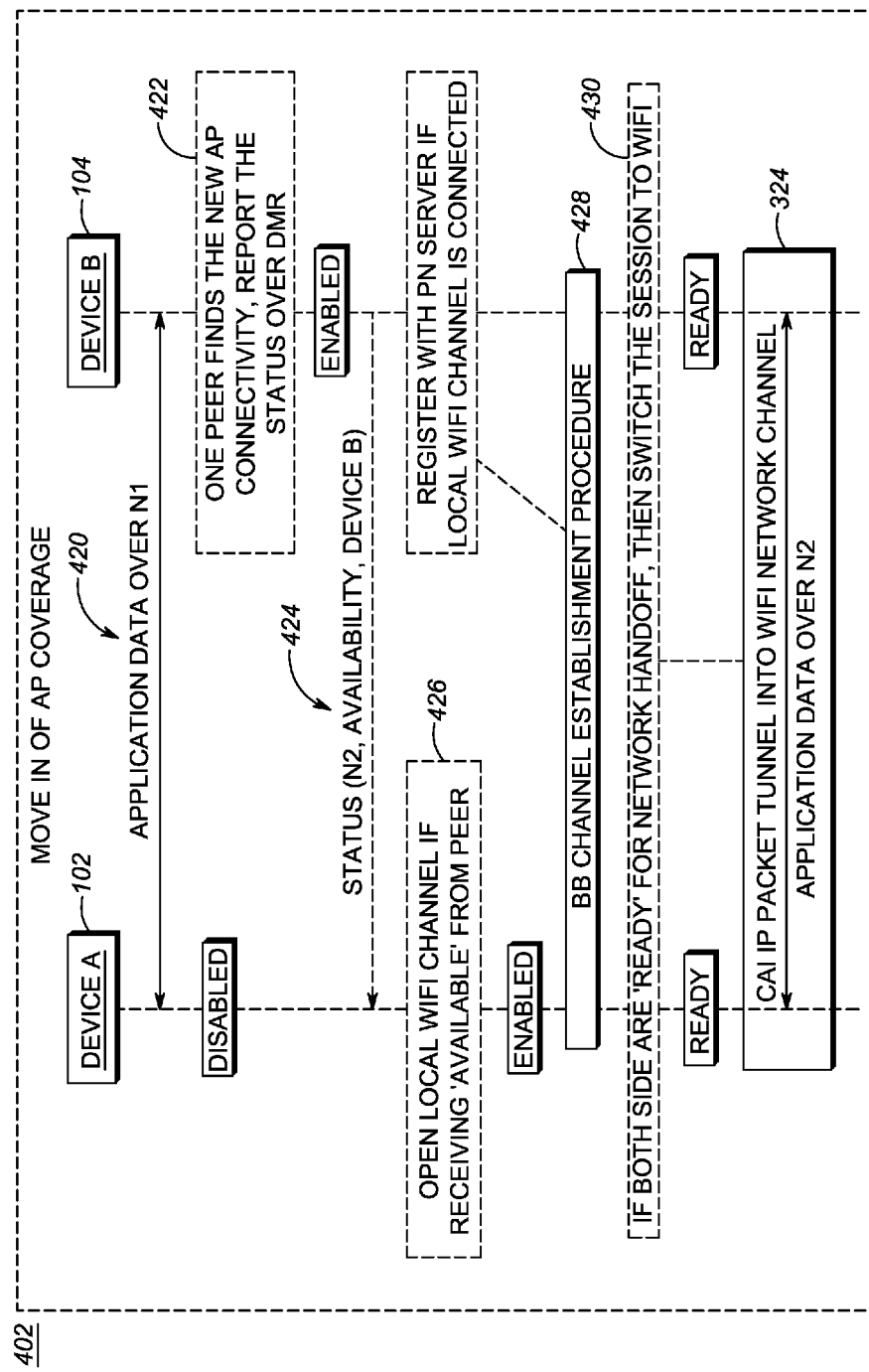

FIGS. 4A-4B are flow diagrams of a process 400 of moving out of AP coverage and a process 402 of moving in AP coverage in accordance with some embodiments. The flow diagrams utilize the exemplary network model 100 and the devices 102, 104 for illustration. The processes 400, 402 determine device behavior responsive to AP changes in a Wi-Fi network (e.g., the broadband network 108). With respect to the process 400, the CAI IP packets are tunneled to the Wi-Fi channel by the devices 102, 104 (step 324). In the process 400, one of the devices 102, 104 loses connectivity with its AP. For example, the device B 104 detects losing AP connectivity and reports is status as such over the narrowband network 106, e.g. DMR (step 410). This can include a status message such as status (N2, unavailability, device B 104) (step 412), and the status of the Wi-Fi network can be changed to disabled at the device B 104.

The device A 102 receives the status message and closes the local Wi-Fi channel and acknowledges this to the device B 104 if no other application is running (step 414). The device A 102 sends a status message, such as over the narrowband network 106, (e.g. DMR), such as status (N2, unavailability, device A 102) (step 416). With both devices 102, 104 disabling the Wi-Fi channel, each updates its application state such as in the prioritized IP interface table to disabled to revert the session back to the narrowband network 106, i.e. DMR (step 418). Finally, the devices 102, 104 revert to communicating application data over the narrowband network 106, N1 (step 420).

With respect to the process 402, the devices are communicating application data over the narrowband network 106, N1 (step 420), and the device A 102 has the Wi-Fi channel disabled. The device B 104 finds new AP connectivity and reports the same over the narrowband network 106, N1, (e.g. DMR) (step 422). The device B 104 sends a status message to the device A 102, status (N2, availability, device B 104) (step 424). At this point, the device B 104 has the Wi-Fi channel enabled. The device A 102 receives the status message and opens the Wi-Fi channel based on the status message showing availability of the channel with the device B 104 (step 426). Now, both the devices 102, 104 are enabled for the Wi-Fi channel, and a broadband channel establishment procedure can include registration with the PN server 202 if the Wi-Fi channel is connected (step 428). Once both the devices 102, 104 are ready (e.g., updating the prioritized IP interface table), then application data can switch the session to Wi-Fi (step 430), and the CAI IP packets are tunneled to the Wi-Fi channel by the devices 102, 104 (step 324).

Variously, the systems and methods propose to cooperatively use the narrowband network 106 with the broadband network 108. For example, DMR can provide an always-on connection whereas Wi-Fi can provide an on-demand connection. To coordinate the activity thereon, DMR (narrowband) can be used as a control channel for selecting the Wi-Fi connection (broadband). The broadband channel state and action of the end devices 102, 104 is defined below with respect to how to activate and select one network service. Here the device A 102 initiates the session to the device B 104 for one application. Note: To reduce latency caused by initial 'handshake', upon power on, a broadband capable device can enable its local broadband connection and register with the PN server 202 for its 'IP address/Ports' presence. It depends on provisioning for particular application.

| Device A's BB channel State | Device B's BB channel State | Action |
|---|---|---|
| Disabled | Disabled | Control signaling over NB: activate remote BB connection, then open local BB connection |
| Disabled | Enabled/Ready | Control signaling over NB: query remote BB connection, then open local BB connection |
| Enabled | Disabled | Query remote over BB, if target is 'absence', then activate remote connection over NB |
| Enabled | Enabled/Ready | Query remote over BB, if target is 'presence', then establish BB channel session |
| Ready | Ready | Transfer application data through ip tunnel over BB |
| Unavailable | Ready/ Unavailable | Control signaling over NB: reset as 'Disabled' for both ends Revert data session over NB if applicable, depending on types of application data(e.g. original port) entering the tunnel |

Figure 5A:
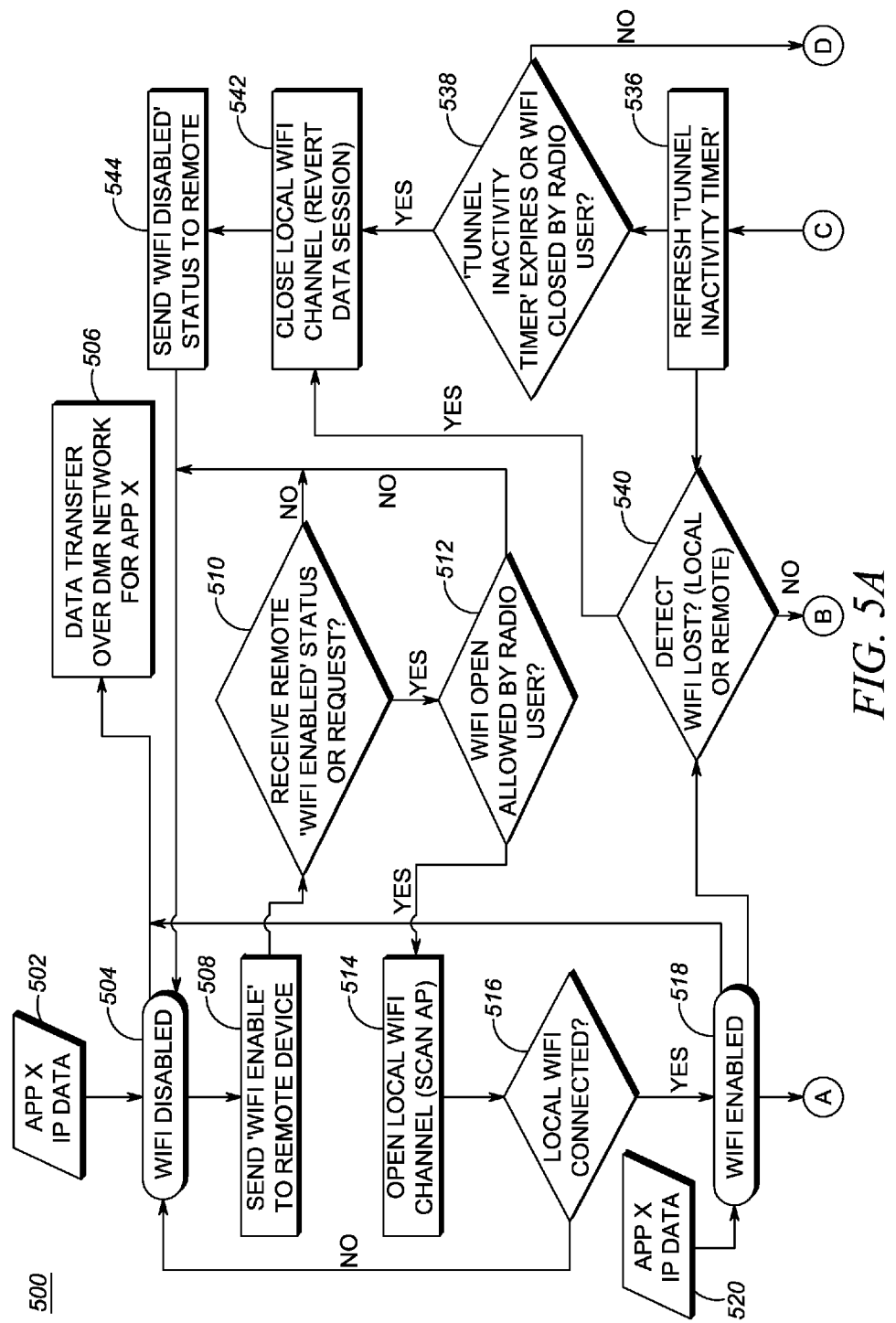
FIGS. 5A-5B are a flowchart of exemplary end device processing by the end devices in accordance with some embodiments.
Figure 5B:
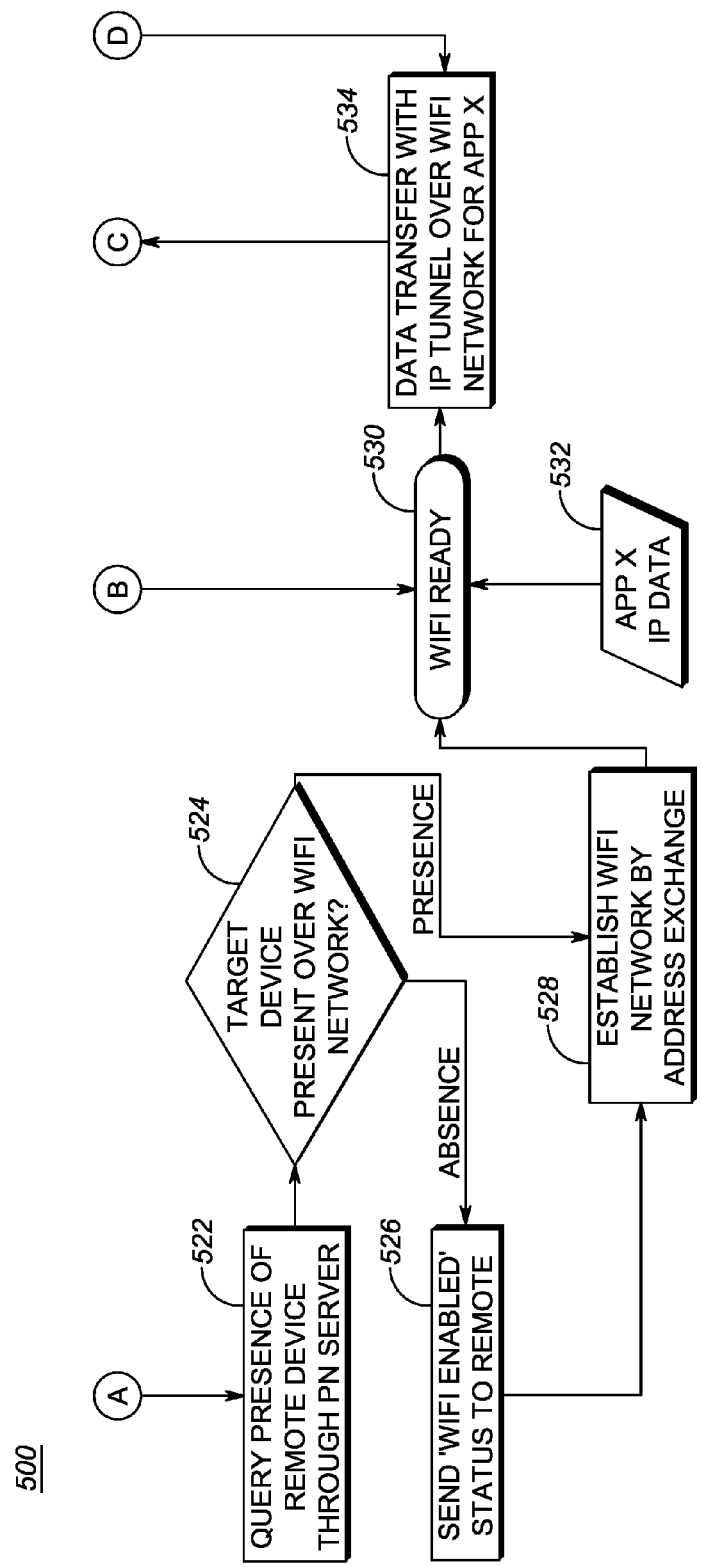

FIGS. 5A-5B are a flowchart of exemplary end device processing 500 by the end devices 102, 104 in accordance with some embodiments. Specifically, the end device processing 500 describes actions taken by the end devices 102, 104 during the application controlled network selection systems and methods. The end device processing 500 is described with reference to an application, App X, which is an application running on the devices 102, 104 seeking to control the network selection between the networks 106, 108 for communications therebetween. Further, the end device processing 500 is illustrated with reference to a single device, i.e. either of the devices 102, 104, and the narrowband network 106 as DMR and the broadband network 108 as Wi-Fi. The end device processing 500 begins with the application, App X, sending IP data (step 502).

Initially, the Wi-Fi is disabled (step 504). With the application controlled network selection, the device 102, 104 can perform data transfer over the DMR network for App X (step 506). The App X may need or desire higher bandwidth transfer rates than are available in DMR, and the end device processing 500 can enable the device 102, 104 to enable Wi-Fi using DMR as a control channel therefor. While transferring data over the DMR network for App X (step 506), the end device processing 500 can send a Wi-Fi enable message to the remote device, such as via the DMR network (step 508). The end device processing 500 checks if it receives a remote Wi-Fi enabled status message or request from the remote device (step 510), and if not, the end device processing 500 continues the data transfer over the DMR network for App X (step 506).

Upon receipt of an acknowledgment from the remote device (step 510), the end device processing 500 checks if Wi-Fi open is allowed by a radio user (step 512), and if not, the end device processing 500 continues the data transfer over the DMR network for App X (step 506). If Wi-Fi is open (step 512), the end device processing 500 opens a local Wi-Fi connection such as by scanning for an AP (step 514). If the end device processing 500 is unable to associate with the AP (step 516), the Wi-Fi remains disabled (step 504). Upon connecting to the AP (step 516), the end device processing 500 enables Wi-Fi (step 518), and App X's IP data continues the data transfer over the DMR network (step 506).

Once the Wi-Fi is enabled (step 518), the end device processing 500 can query the presence of the remote device through the PN server 202 (step 522). The end device processing 500 checks for the present of the remote or target device over the Wi-Fi network (step 524). If the remote device is absent, the end device processing 500 sends a Wi-Fi enabled status message to the remote device (step 526) such that the remote device is triggered to enabled its Wi-Fi and register with the PN server 202. If the remote device is present with the PN server 202, the end device processing 500 establishes the Wi-Fi network through an address exchange (step 528) such as over the DMR network.

At this point, the Wi-Fi is ready (step 530), both devices 102, 104 are aware of each other's presence and appropriate addressing over the Wi-Fi network, and the App X can send IP data (step 532) over the Wi-Fi network based thereon (step 534). The end device processing 500 can establish a tunnel activity timer (step 536) and refresh it periodically based on traffic on the Wi-Fi network (step 538). At various points, the end device processing 500 can detect a lost Wi-Fi connection (either local or remote) (step 540). Responsive to losing the Wi-Fi connection (step 540) or expiration of the tunnel activity timer (step 538), the end device processing 500 can close the local Wi-Fi channel to revert the data session (step 542). The end device processing 500 can send a Wi-Fi disabled status message to the remote device (step 544) and return to the Wi-Fi being disabled (step 504).

Figure 6:
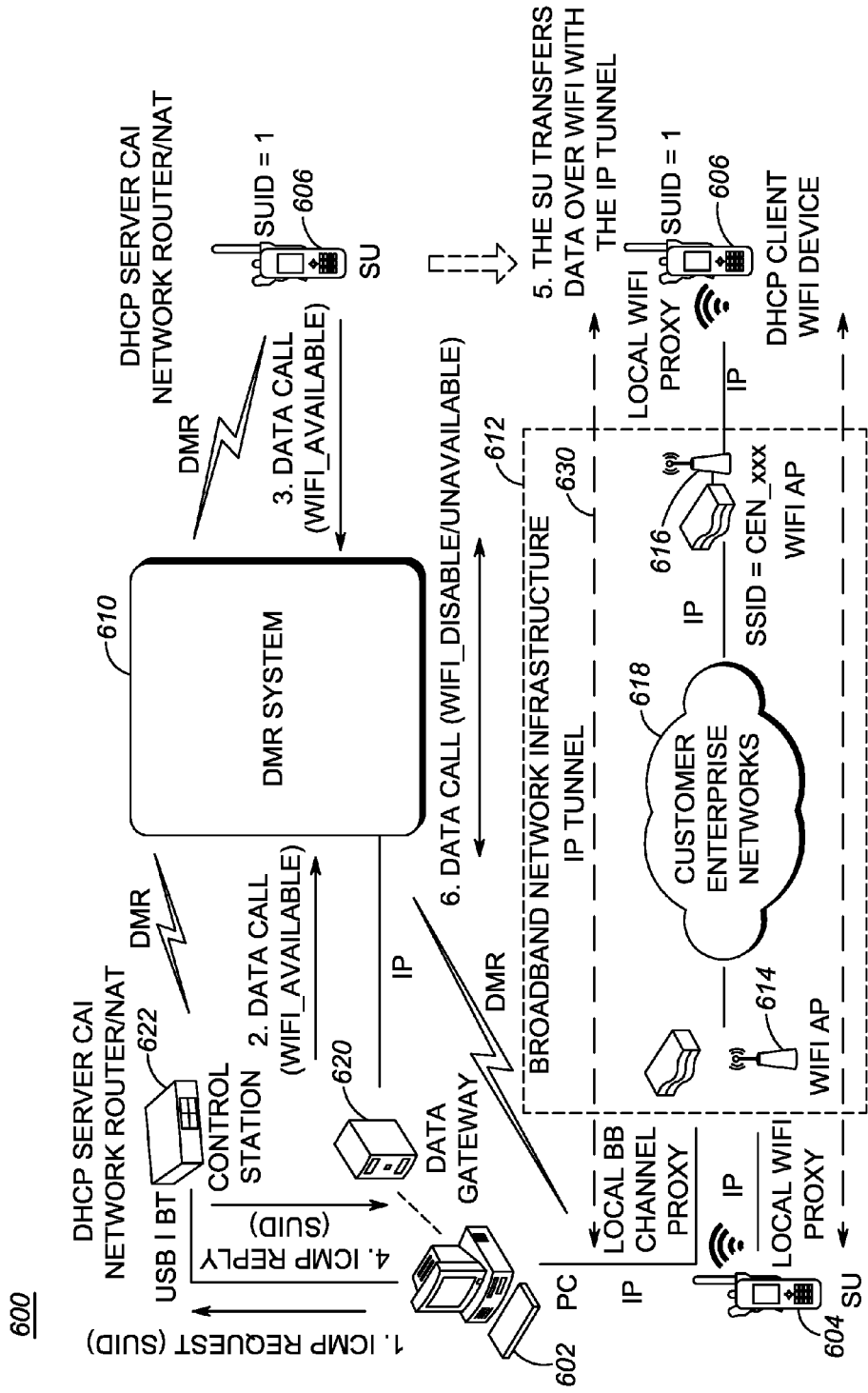
FIG. 6 is a network diagram of a network illustrating an exemplary use case of the systems and method between subscriber units (SUs) and/or computers in accordance with some embodiments.

FIG. 6 is a network diagram of a network 600 illustrating an exemplary use case of the systems and method between subscriber units (SUs) and/or computers in accordance with some embodiments. Specifically, the network 600 illustrates a use case between a computer 602 or a SU 604 and a remote SU 606. The network 600 includes a DMR system 610 as the narrowband network 106 and a broadband network infrastructure 612 as the broadband network 108. The broadband network infrastructure 612 includes Wi-Fi APs 614, 616 communicatively coupled to one another via customer enterprise networks 618. The network 600 illustrates connectivity between the computer 602 and the remote SU 606 and connectivity between the SU 604 and the remote SU 606 using the systems and method described herein.

First, for connectivity between the computer 602 and the remote SU 606, the computer 602 can communicate to the DMR system 610 via a data gateway 620 that can have an IP connection to the DMR system 610. In operation, the computer 602 can make an Internet Control Message Protocol (ICMP) request to a Dynamic Host Configuration Protocol (DHCP) CAI network router 622 which can send a Wi-Fi enable data call message to the remote SU 606 via the DMR system 610. The remote SU 606 can respond with a Wi-Fi available data call response, and the network router 622 can provide an ICMP reply with the remote SU 606's subscriber unit ID (SUID). Subsequently, the remote SU 606 and the computer 602 can transfer data therebetween over the broadband network infrastructure 612, e.g. Wi-Fi, using an IP tunnel 630. When finished, based on a timeout, or if Wi-Fi is unavailable, the computer 602 and the remote SU 606 can exchange a Wi-Fi disable or unavailable data call message over the DMR system 610. Connectivity between the SU 604 and the remote SU 606 can be in a similar manner with the SU 604 directly connecting to the DMR system 610.

Figure 7:
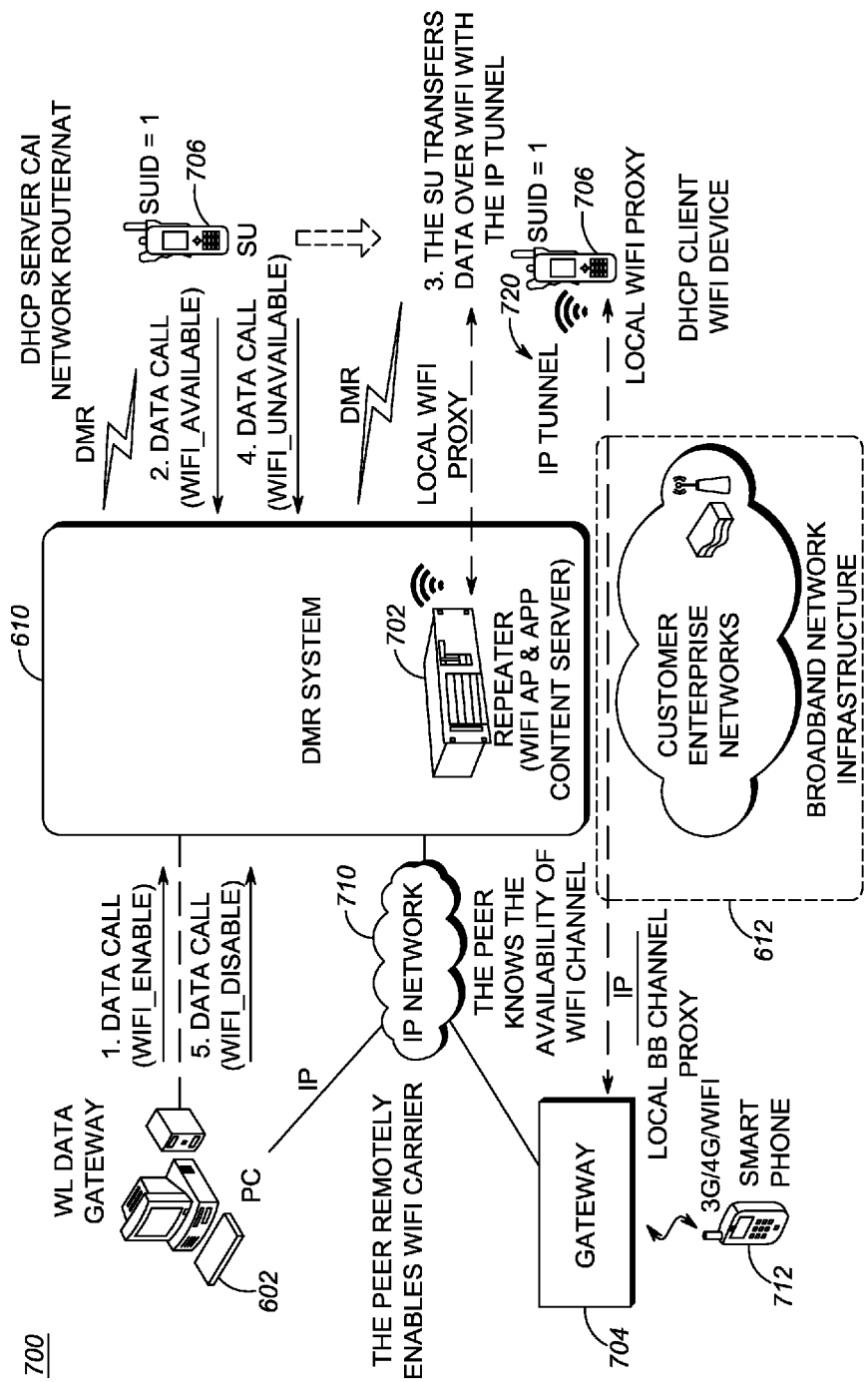
FIG. 7 is a network diagram of a network illustrating an exemplary use case of the systems and method between subscriber units (SUs) and a repeater or a data gateway in accordance with some embodiments.

FIG. 7 is a network diagram of a network 700 illustrating an exemplary use case of the systems and method between subscriber units (SUs) and a repeater or a data gateway in accordance with some embodiments. Specifically, the network 700 illustrates a use case between a repeater 702 or a gateway 704 and a remote SU 706. Similar to the network 600, the network 700 includes the computer 602 and a DMR system 610 as the narrowband network 106 and a broadband network infrastructure 612 as the broadband network 108. In this exemplary embodiment, the computer 602 can push data to the repeater 702 which acts as a content server. The computer 602 and the gateway 704 can connect to the DMR system 610 via an IP network 710. Additionally, a mobile device 712 such as a smart phone can connect via the gateway 704.

In operation, the computer 602 or the smart phone 704 can make a Wi-Fi enable data call through the DMR system 610 to the remote SU 706. The SU 706 can respond with a Wi-Fi available data call while the SU 706 connects to a Wi-Fi AP such as the repeater 702 or an AP in the broadband network infrastructure 612. Subsequently, data is transferred between the SU 706 and the computer 602 or the gateway 704 via an IP tunnel 720. At some point, the SU 706 can send a Wi-Fi unavailable data call to the computer 602 or the gateway 704 via the DMR system 610, and the computer 602 or the gateway 704 can respond with a Wi-Fi disable data call through the DMR system 610.

Figure 8:
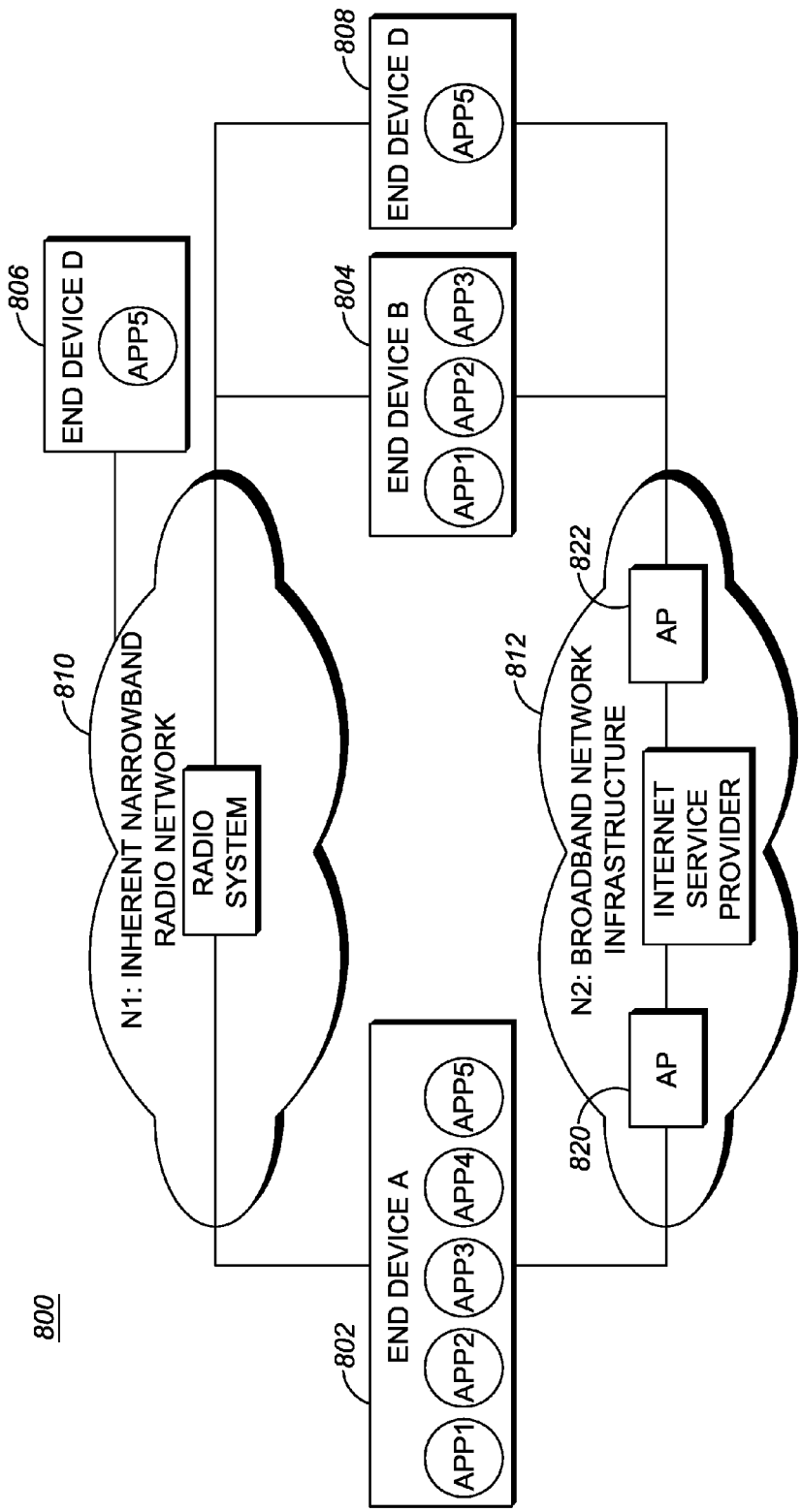
FIG. 8 is a network diagram of a network with four end devices and two different networks in accordance with some embodiments.

FIG. 8 is a network diagram of a network 800 with four end devices 802, 804, 806, 808 and two different networks 810, 812 in accordance with some embodiments. The network 800 is similar to the network model 100 illustrated in FIG. 1. The end devices 802, 804, 806, 808 are each operating one or more of five applications (labeled APP1-APP5). The network 810 is the narrowband network 106 such as, for example, DMR, and the network 812 is the broadband network 108 such as, for example, Wi-Fi with APs 820, 822. The systems and methods described herein allow management of multiple active remote end to end IP connections over heterogeneous networks (e.g. DMR and Wi-Fi) for device communication with an application-based selection.

As described herein, the end devices 802, 804, 806, 808 utilize the narrowband network 810 for control and activation of the broadband network 812 as well as automatic network switching between the networks 810, 812 for end-to-end device data communication without session interrupt. That is, the narrowband network 810 is "always on" and can be a backup when the broadband network 812 is unavailable. The end device 802, 804, 806, 808 IP addressing/Port exchange is performed through the PN server for radio network management. Note, the systems and methods described herein are lower cost compared with other 'routing' based methods, as they do not require significant changes at middle nodes such as APs, gateways, or application servers. Hence the systems and methods can reuse existing infrastructure without significant manufacturing costs or technical expertise, and avoid troublesome system deployment.

For example, assume in the example of FIG. 8 that the end device 802 is a source device. Again, activation and deactivation of a broadband connection in the broadband network 812 is performed using a narrowband connection in the narrowband network 810. The end device 802, as the source device, provides its source broadband public network address (assuming it acquired one locally) to a target device, e.g. the end devices 804, 806, 808, and inquires on the status of the target device's broadband connection, using the narrowband connection. If it did not acquire a broadband address, it would use the narrowband connection for the data transfer.

Upon reception of the source's broadband network address and inquiry on the status of its broadband connection, the target device enables its broadband capability, acquires a connection, and acquires its broadband network address. The target device replies over the narrowband connection with a positive indication and its broadband address when the broadband network connection is established. The target device replies over the narrowband network 810 with a negative indication when the broadband connection cannot be established. The source and target device create a broadband connection through the broadband network 812 using their now known source and target broadband network address. A tunnel with broadband proxy port is created so that the applications can use the narrowband IP Address/Port. Data is transferred on the broadband network between the source and destination devices.

The broadband connection between the source and target device either times out due to inactivity or is directly closed using a message on the narrowband network. The end devices 802, 804, 806, 808 can automatically switch application data among preferred networks for an active session. If the broadband connection becomes available, the device notifies its broadband network status using the narrowband network. The peer device replies its broadband network status using the narrowband network. Upon both peers' broadband network connection are ready, the application data communication can be switched to the broadband connection from the narrowband connection. If the broadband connection becomes unavailable, the device notifies its broadband network status using the narrowband network 810. The peer device replies its broadband network status using the narrowband network 810. The application data communication can be switched to the narrowband connection from the broadband connection.

The end devices 802, 804, 806, 808 can be configured with a priority level per end to end connection per application. If both connections are available, the priority selects the connection to utilize per application. If only one connection is available, the available connection is utilized per application. If one specific connection is specified, and that connection is not available, the delivery is failed or queued. This is applicable to multiple connections per priority. The systems and methods can also make use of a centralized server, i.e. the PN server, instead of a peer-to-peer connection between devices. Rather than handshaking broadband network addresses when a session is required, the centralized server can be utilized to store the acquired broadband network address of all devices.

The devices can setup a peer-to-peer connection between devices when a session is required. The devices can acquire each other's broadband network address, using the broadband network connection via the PN server. Further, network connections can optionally be established from a device to a centralized server upon broadband network connection, and devices can forward messages through the centralized server when a session is required. The centralized server can also be utilized to notify the broadband network status change of device, thus the device can switch network via the server.

In the example of FIG. 8, again the end device 802 is considered the source device and is operating all five applications, APP1-APP5. Here, multiple simultaneous sessions are supported on the end device 802 without impacting one another. For example, the end device 802 can communicate through APP1 with the end device 804 over the narrowband network 810 only. The end device 802 can communicate through APP2 with the end device 804 over either of the networks 810, 812 via a tunnel and switch between the networks 810, 812 without breaking the APP2 or the other applications. The end device 802 can communicate through APP3 with the end device 804 over the broadband network 812 only. The end device 802 can communicate through APP4 with the end device 806 only over the narrowband network 810. Finally, the end device 802 can communicate through APP5 with the end device 808 over the broadband network 812 only. Of note, all of the configuration herein is performed in software on the end devices 802, 804, 806, 808 which enable per application routing of data between the networks 810, 812 as well as automatic activation/deactivation of a tunnel in the broadband network 812 using the narrowband network 810.

Figure 9A:
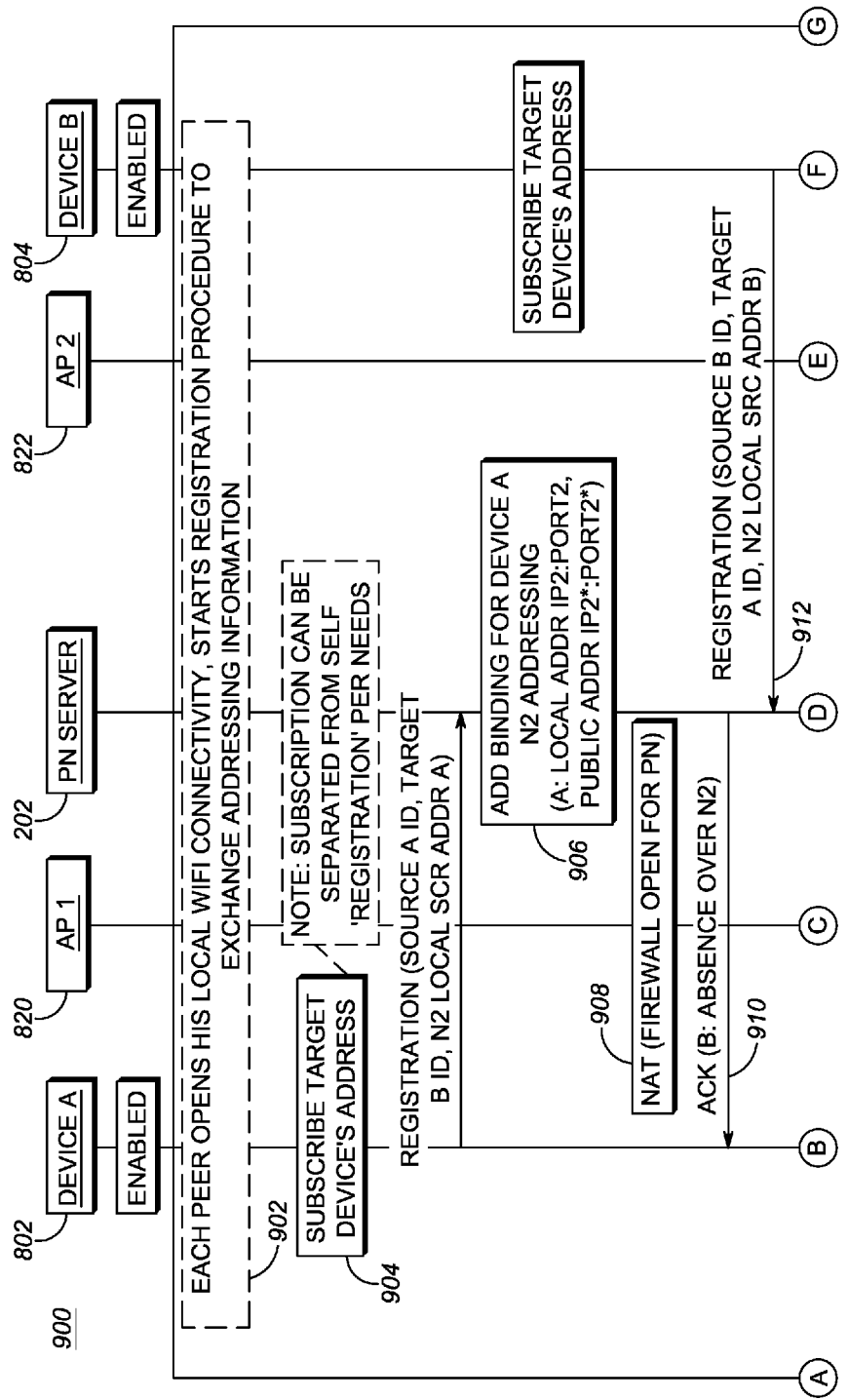
FIGS. 9A-9B are a data flow diagram of a method for establishing a broadband channel over a narrowband network using peer address exchange across wide area networks (WANs) in accordance with some embodiments.
Figure 9B:
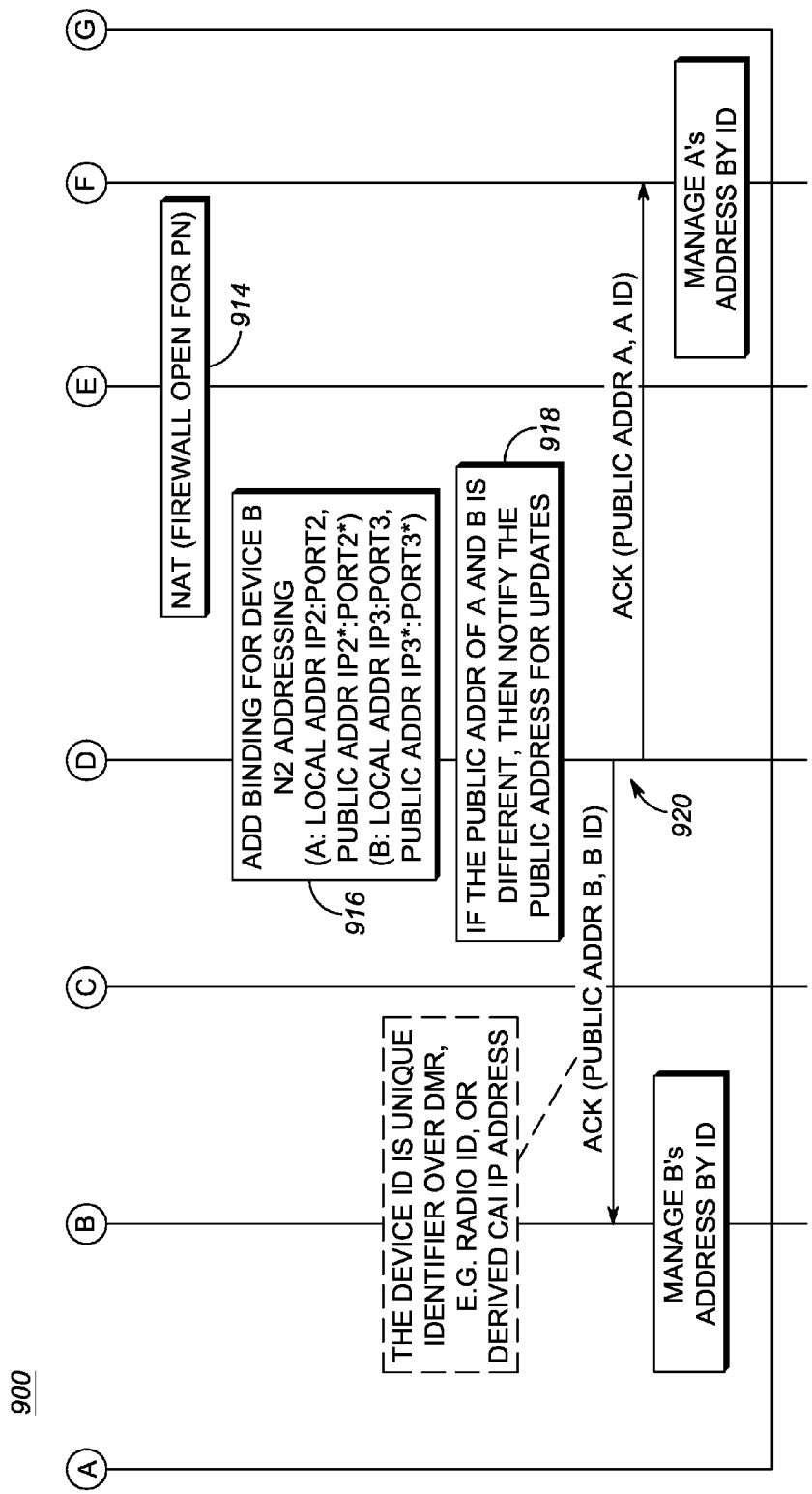

FIGS. 9A-9B are a data flow diagram of a method 900 for establishing a broadband channel over a narrowband network using peer address exchange across wide area networks (WANs) in accordance with some embodiments. For illustration purposes, the method 900 is described between the end devices 802, 804 and the APs 820, 822 in the network 800. First, each of the devices 802, 804 opens local Wi-Fi connectivity and starts a registration procedure to exchange addressing information (step 902). The end device 802 communicates the target device, i.e. the end device 804, address to the PN server 202 (step 904). This communication can include a registration message with an identifier for the end device 802 (i.e., Source A ID), an identifier for the end device 804 (i.e., Target B ID), and an address of the end device 802 in the broadband network (i.e., N2 local source addr A).

The PN server 202 can add a binding for the end device 802 in the broadband network (step 906) (i.e., A: local addr IP2:port2, public addr ip2*:port2*). The AP 802 can perform network address translation (NAT) leaving a firewall open for the PN server 202 (step 908). It is assumed that the device 804 is not present in the PN server 202, and the PN server 202 responds to the device 802 with an ACK stating the absence of the device 804 on the broadband network (step 910). Subsequently, the device 804 registers with the PN server 202 via a registration message (step 912). Similar to the registration message of the device 802, the communication can include a registration message with an identifier for the end device 804 (i.e., Source B ID), an identifier for the end device 802 (i.e., Target A ID), and an address of the end device 804 in the broadband network (i.e., N2 local source addr B). The AP 822 can perform network address translation (NAT) leaving a firewall open for the PN server 202 (step 914).

Subsequent to the registration message from the device 804, the PN server 202 can add a binding for the device 804 and its broadband network address (step 916). The PN server 202 now includes bindings for both the devices 802, 804, and if either address changes, the PN server 202 is updated (step 918). The PN server 202 can provide ACK messages to each of the devices 802, 804 with the other device's public address (step 920). Note, the public address is for the broadband network and can be indexed to the device's ID in DMR or the device's derived CAI IP address. The devices 802, 804 now have the public, broadband addresses of one another and can use these addresses for data communications over the broadband network.

Figure 10A:
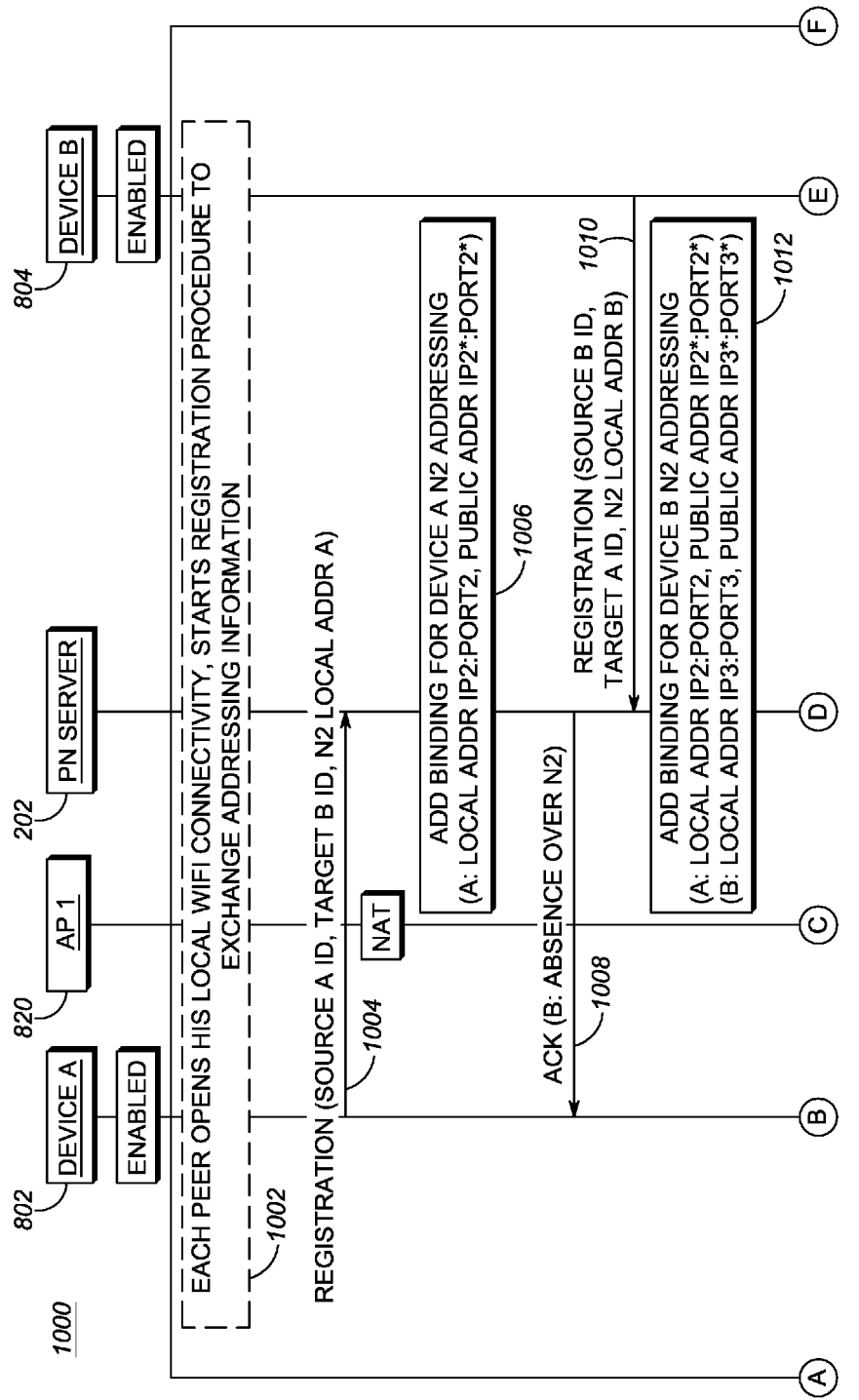
FIGS. 10A-10B are a data flow diagram of a method for establishing a broadband channel over a narrowband network using peer address exchange inside a WAN in accordance with some embodiments.
Figure 10B:
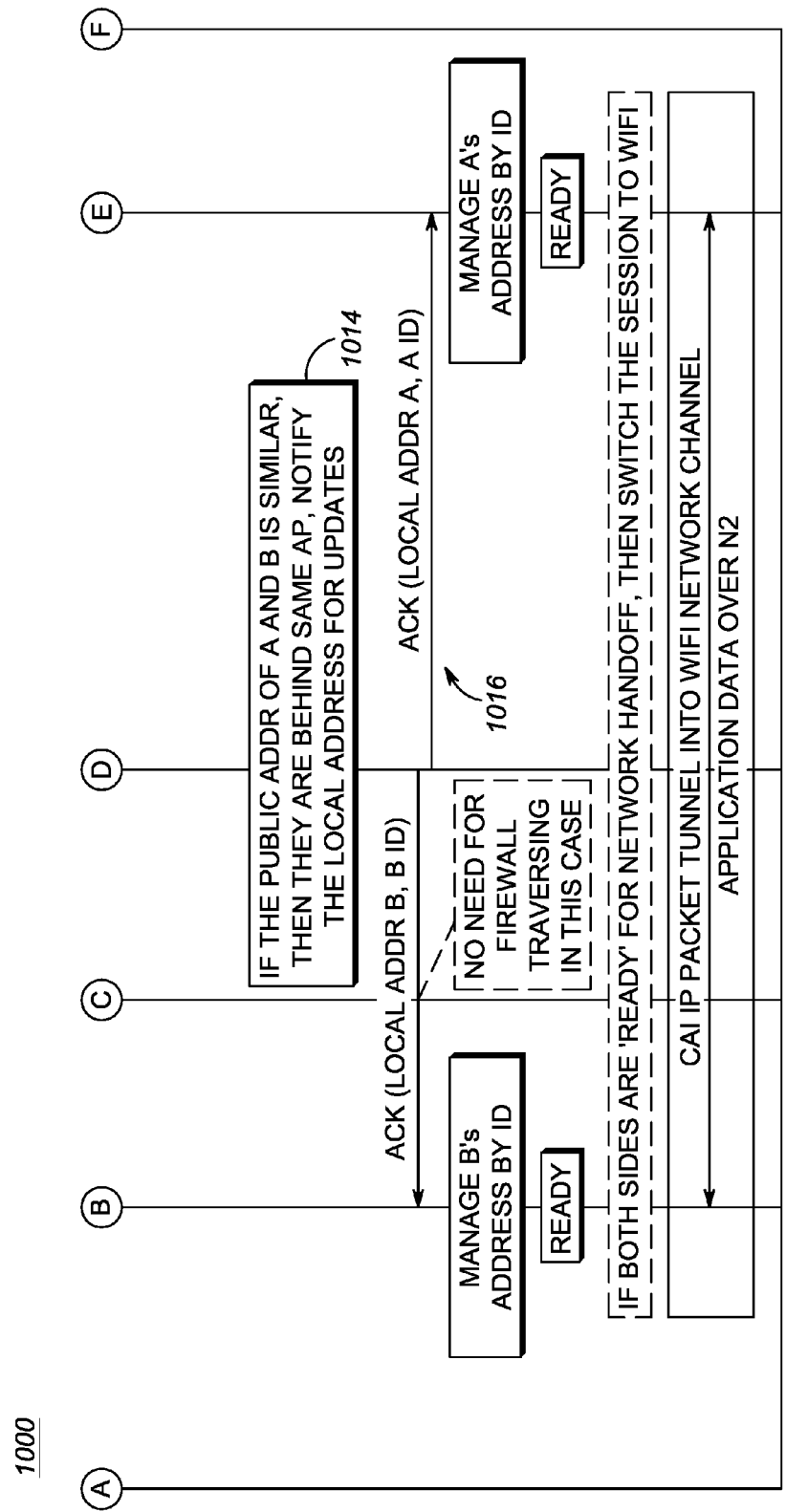

FIGS. 10A-10B are a data flow diagram of a method 1000 for establishing a broadband channel over a narrowband network using peer address exchange inside a WAN in accordance with some embodiments. Similar to the method 900, the method 1000 is illustrated with reference to the end devices 802, 804 and the AP 820 in the network 800. First, each of the devices 802, 804 opens local Wi-Fi connectivity and starts a registration procedure to exchange addressing information (step 1002). The end device 802 communicates the target device, i.e. the end device 804, address to the PN server 202 (step 1004). This communication can include a registration message with an identifier for the end device 802 (i.e., Source A ID), an identifier for the end device 804 (i.e., Target B ID), and an address of the end device 802 in the broadband network (i.e., N2 local source addr A).

The AP 820 can perform a NAT, and the PN server 202 can add a binding for the end device 802 in the broadband network (step 1006) (i.e., A: local addr IP2:port2, public addr ip2*:port2*). It is assumed that the device 804 is not present in the PN server 202, and the PN server 202 responds to the device 802 with an ACK stating the absence of the device 804 on the broadband network (step 1008). Subsequently, the device 804 registers with the PN server 202 via a registration message (step 1010). Similar to the registration message of the device 802, the communication can include a registration message with an identifier for the end device 804 (i.e., Source B ID), an identifier for the end device 802 (i.e., Target A ID), and an address of the end device 804 in the broadband network (i.e., N2 local source addr B).

Subsequent to the registration message from the device 804, the PN server 202 can add a binding for the device 804 and its broadband network address (step 1012). If the public addresses of the devices 802, 804, they are behind the same AP 820, and the PN server is updated as these addresses change (step 1014). The PN server 202 can provide ACK messages to each of the devices 802, 804 with the other device's public address (step 1016). Note, the public address is for the broadband network and can be indexed to the device's ID in DMR or the device's derived CAI IP address. The devices 802, 804 now have the broadband addresses of one another and can use these addresses for data communications over the broadband network. Since the method 1000 is within the WAN, there is no need for firewall traversal.

Figure 11A:
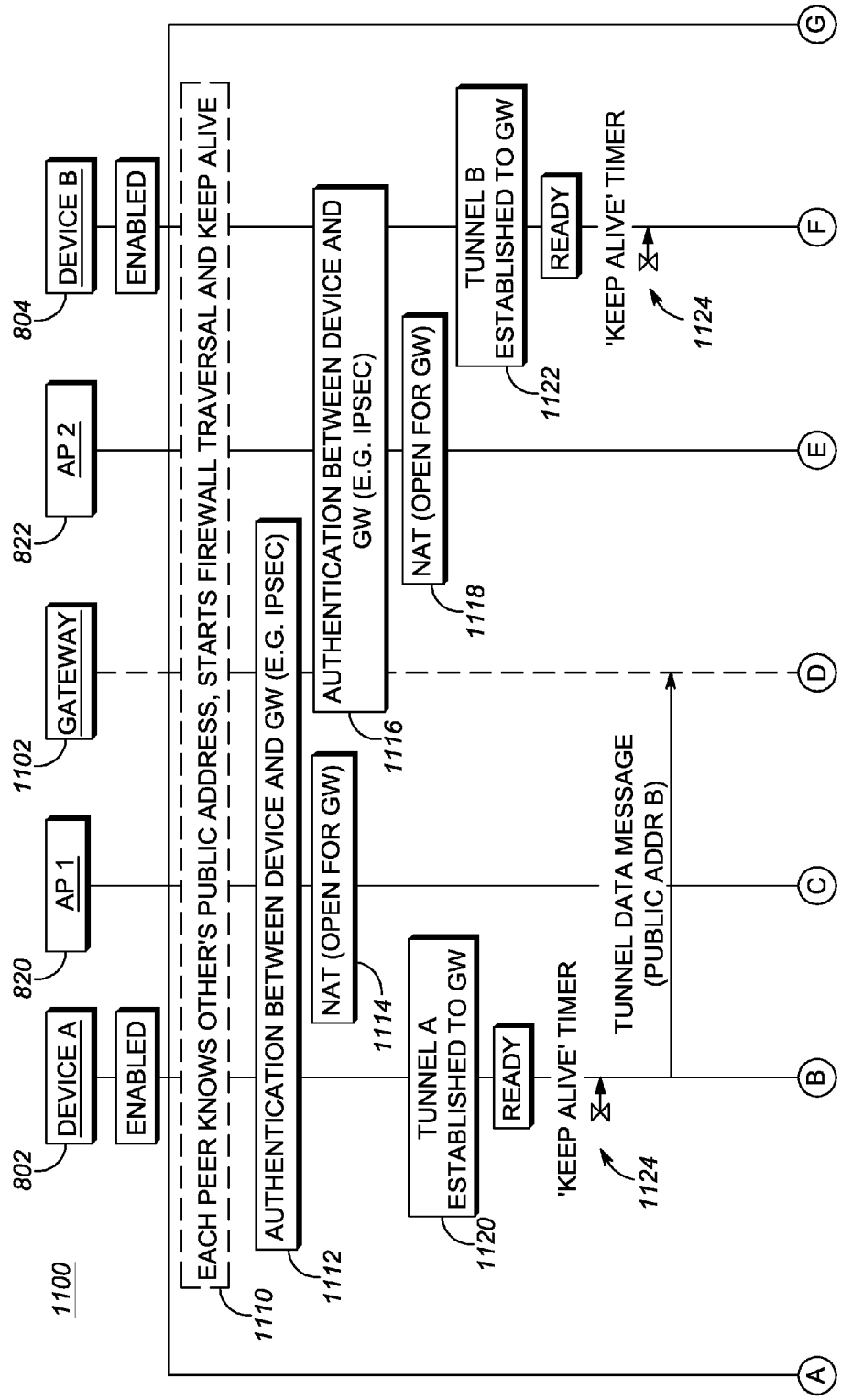
FIGS. 11A-11B are a data flow diagram of a method for firewall traversal in a gateway mode in accordance with some embodiments.
Figure 11B:
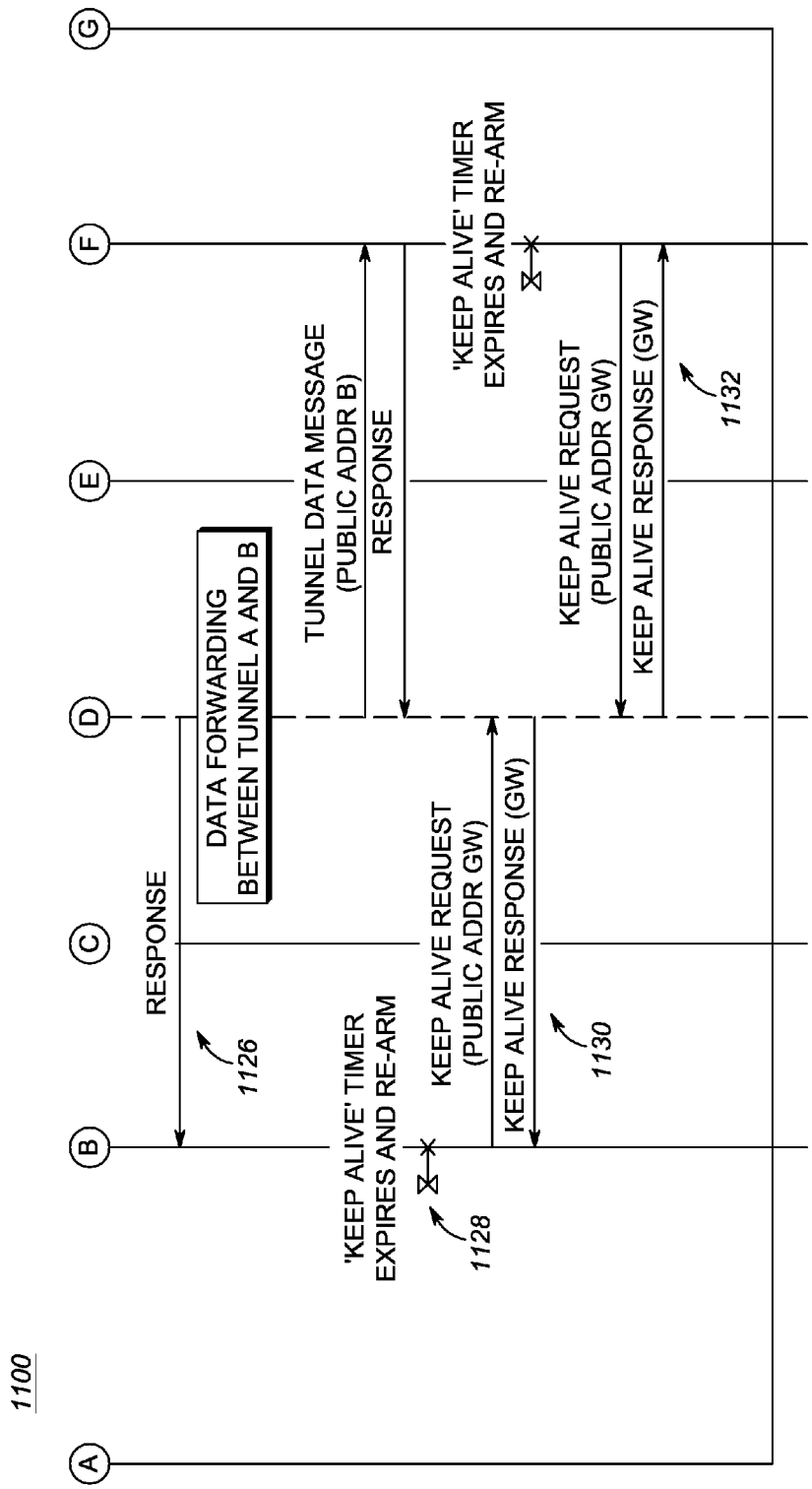

FIGS. 11A-11B are a data flow diagram of a method 1100 for firewall traversal in a gateway mode in accordance with some embodiments. Specifically, the method 1100 can be used between the devices 802, 804 when there is a firewall between them over the broadband network. Again, the method 1100 is illustrated with reference to the end devices 802, 804 and the APs 820, 822 and a gateway 1102 in the network 800. Each peer device 802, 802 knows the other's public address, i.e. address in the broadband network, and starts a firewall traversal and keep alive (step 1110). The method 1100 includes the device 802 performing authentication with the gateway 1102, e.g. via IPSec (step 1112). The AP 820 has the NAT open for the gateway 1102 (step 1114). The method 1100 includes the device 804 performing authentication with the gateway 1102, e.g. via IPSec (step 1116). The AP 822 has the NAT open for the gateway 1102 (step 1118).

The method 1100 includes the device 802 establishing a tunnel A to the gateway 1102 (step 1120) and the device 804 establishing a tunnel B to the gateway 1102 (step 1122). Now, both the devices 802, 804 are ready and they each implement a "keep alive" timer (step 1124). The device 802 can send data to the device 804 via a tunnel data message to the gateway 1102 with data forwarded between the tunnels A, B by the gateway 1102 and to the device 804 (step 1126). If no data is transmitted for a predetermined time period, the keep alive time can expire (step 1128) and the device 802 can send a keep alive request to the gateway 1102 upon the expiration (step 1130). A similar process can occur at the device 804 responsive to an expiration of the keep alive timer (step 1132).

Figure 12A:
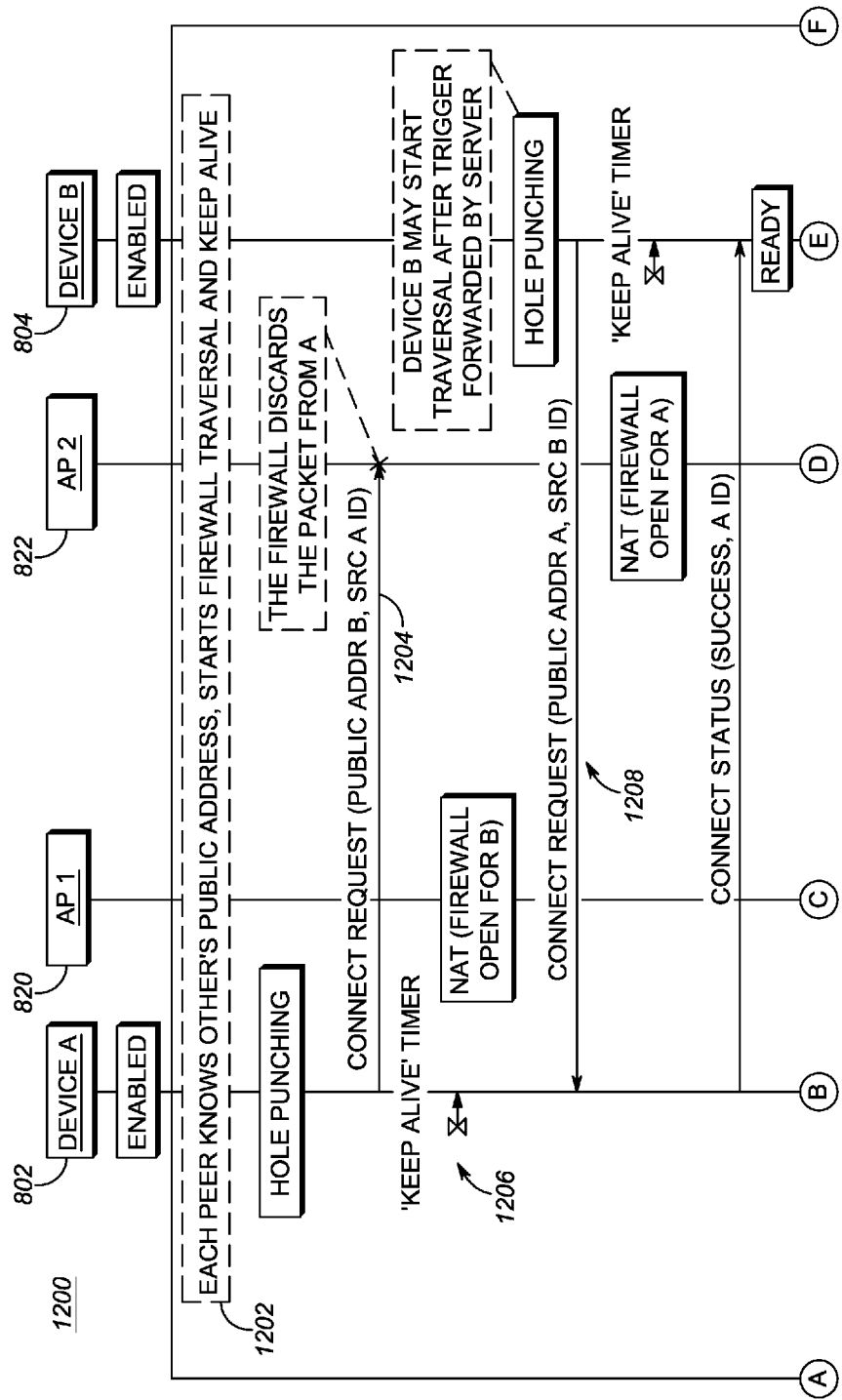
FIGS. 12A-12B are a data flow diagram of a method for firewall traversal in a point-to-point mode in accordance with some embodiments.
Figure 12B:
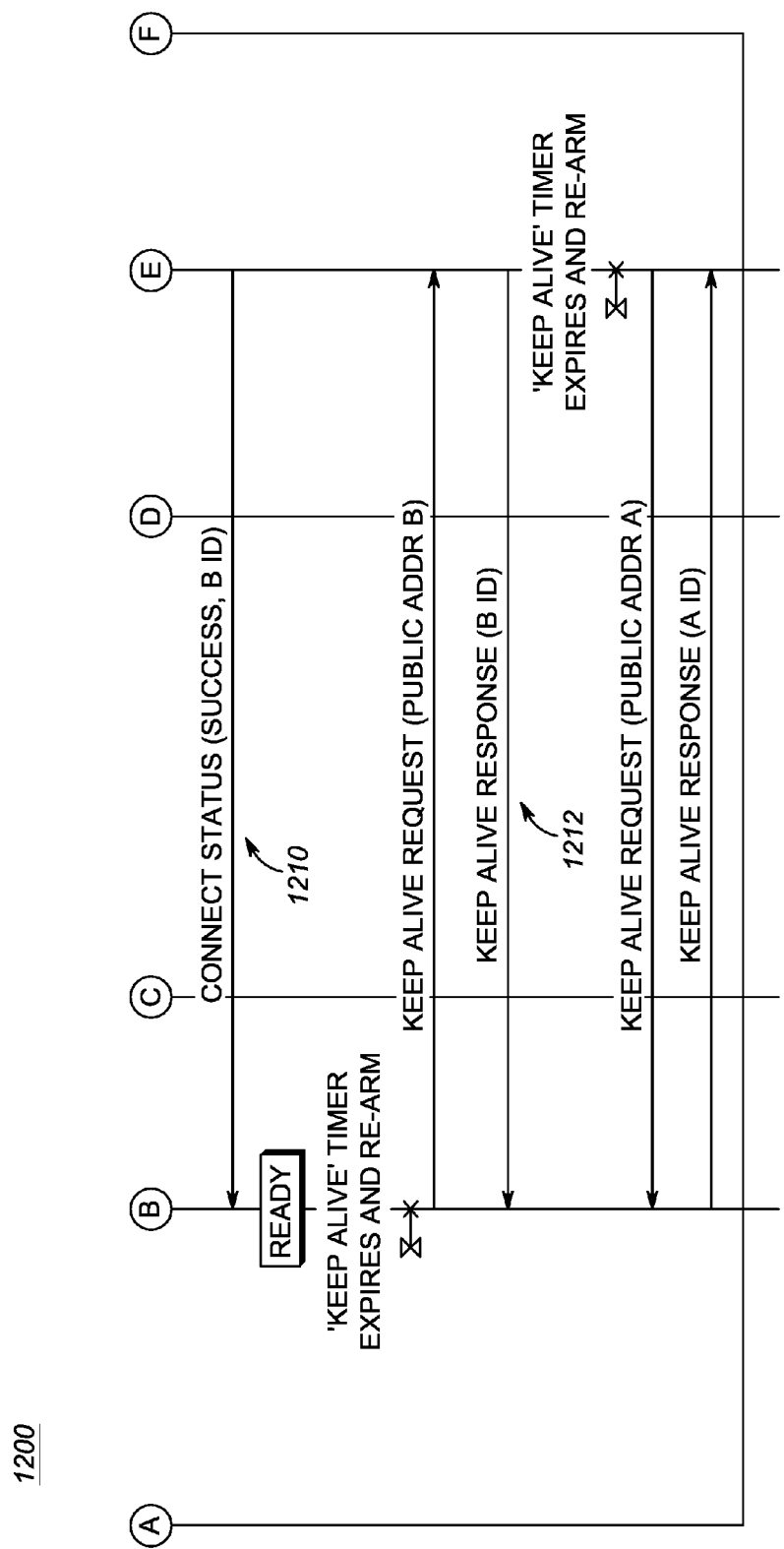

FIGS. 12A-12B are a data flow diagram of a method 1200 for firewall traversal in a Peer-to-Peer mode in accordance with some embodiments. Specifically, the method 1200 can be used between the devices 802, 804 when there is a firewall between them over the broadband network. Again, the method 1200 is illustrated with reference to the end devices 802, 804 and the APs 820, 822 in the network 800. Each peer device 802, 802 knows the other's public address, i.e. address in the broadband network, and starts a firewall traversal and keep alive (step 1202). The method 1200 includes the device 802 performing hole punching where a connect request is sent to the device 804, but discarded from the AP 822 (step 1204). A keep alive timer is created at the device 802 and the AP 820 opens the firewall for the device 804 (step 1206). A similar process is performed by the device 804 and the AP 822 (step 1208). Once the firewall is traversed, the devices 802, 804 can send connection status messages to one another indicating the same (step 1210). The devices 802, 804 can maintain the keep alive timer and at the expiration, send keep alive responses to ensure the firewall remains open (step 1212).

Figure 13:
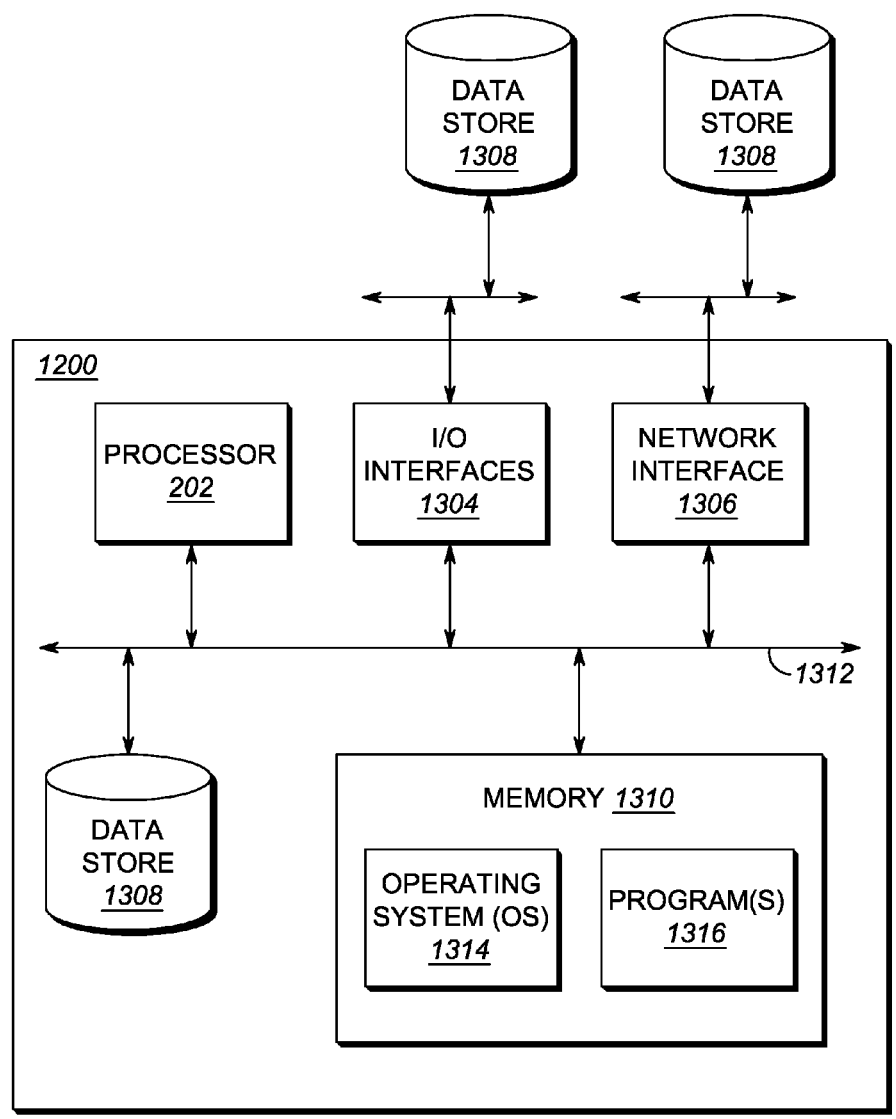
FIG. 13 is a block diagram of a server which may be used with the systems and methods described herein in accordance with some embodiments.

FIG. 13 is a block diagram of a server 1300 which may be used with the systems and methods described herein in accordance with some embodiments. The server 1300 may be a digital computer that, in terms of hardware architecture, generally includes a processor 1302, input/output (I/O) interfaces 1304, a network interface 1306, a data store 1308, and memory 1310. It should be appreciated by those of ordinary skill in the art that FIG. 13 depicts the server 1300 in an oversimplified manner, and a practical embodiment may include additional components and suitably configured processing logic to support known or conventional operating features that are not described in detail herein. The components (1302, 1304, 1306, 1308, and 1310) are communicatively coupled via a local interface 1312. The local interface 1312 may be, for example but not limited to, one or more buses or other wired or wireless connections, as is known in the art. The local interface 1312 may have additional elements, which are omitted for simplicity, such as controllers, buffers (caches), drivers, repeaters, and receivers, among many others, to enable communications. Further, the local interface 1312 may include address, control, and/or data connections to enable appropriate communications among the aforementioned components.

The processor 1302 is a hardware device for executing software instructions. The processor 1302 may be any custom made or commercially available processor, a central processing unit (CPU), an auxiliary processor among several processors associated with the server 1300, a semiconductor-based microprocessor (in the form of a microchip or chip set), or generally any device for executing software instructions. When the server 1300 is in operation, the processor 1302 is configured to execute software stored within the memory 1310, to communicate data to and from the memory 1310, and to generally control operations of the server 1300 pursuant to the software instructions. The I/O interfaces 1304 may be used to receive user input from and/or for providing system output to one or more devices or components. User input may be provided via, for example, a keyboard, touch pad, and/or a mouse. System output may be provided via a display device and a printer (not shown). I/O interfaces 1304 may include, for example, a serial port, a parallel port, a small computer system interface (SCSI), a serial ATA (SATA), a fibre channel, INFINIBAND, iSCSI, a PCI Express interface (PCI-x), an infrared (IR) interface, a radio frequency (RF) interface, and/or a universal serial bus (USB) interface.

The network interface 1306 may be used to enable the server 1300 to communicate on a network, such as the Internet, a wide area network (WAN), a local area network (LAN), and the like, etc. The network interface 1306 can include multiple devices to enable multiple connections to the network. In the various exemplary embodiments described herein, the network interface 1306 can form the ISSI NNI with another server 1300 as well as connect the server 1300 to any of the SUs 16, 18. The network interface 1306 may include, for example, an Ethernet card or adapter (e.g., 10BaseT, Fast Ethernet, Gigabit Ethernet, 10 GbE, etc.) or a wireless local area network (WLAN) card or adapter (e.g., 802.11a/b/g/n). The network interface 1306 may include address, control, and/or data connections to enable appropriate communications on the network. A data store 1308 may be used to store data. The data store 1308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 1308 may incorporate electronic, magnetic, optical, and/or other types of storage media. In one example, the data store 1208 may be located internal to the server 1300 such as, for example, an internal hard drive connected to the local interface 1312 in the server 1300. Additionally in another embodiment, the data store 1308 may be located external to the server 1300 such as, for example, an external hard drive connected to the I/O interfaces 1304 (e.g., SCSI or USB connection). In a further embodiment, the data store 1308 may be connected to the server 1300 through a network, such as, for example, a network attached file server.

The memory 1310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 1310 may incorporate electronic, magnetic, optical, and/or other types of storage media. Note that the memory 1310 may have a distributed architecture, where various components are situated remotely from one another, but can be accessed by the processor 1302. The software in memory 1310 may include one or more software programs, each of which includes an ordered listing of executable instructions for implementing logical functions. The software in the memory 1310 includes a suitable operating system (O/S) 1314 and one or more programs 1316. The operating system 1314 essentially controls the execution of other computer programs, such as the one or more programs 1316, and provides scheduling, input-output control, file and data management, memory management, and communication control and related services. The one or more programs 1316 may be configured to implement the various processes, algorithms, methods, techniques, etc. described herein, such as including but not limited to the processing steps and message transmissions and receptions as set forth in FIGS. 2, 9A-9B, and 10A-10B.

Figure 14:
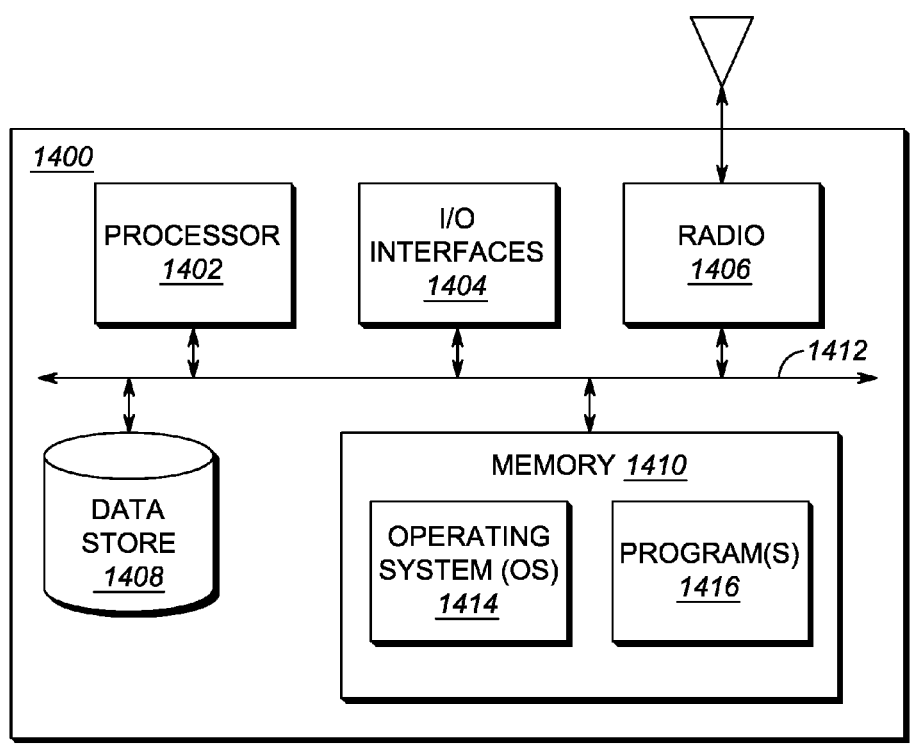
FIG. 14 is a block diagram of an end device which may be used with the systems and methods described herein in accordance with some embodiments.

FIG. 14 is a block diagram of an end device 1400 which may be used with the systems and methods described herein in accordance with some embodiments. For example, the end device 1400 can be an exemplary implementation of the end devices 102, 104, 802, 804 or the SUs 602, 604. The end device 1400 can be a digital device that, in terms of hardware architecture, generally includes a processor 1402, input/output (I/O) interfaces 1404, a radio 1406, a data store 1408, and memory 1410. It should be appreciated by those of ordinary skill in the art that FIG. 14 depicts the end device 1400 in an oversimplified manner, and a practical embodiment may include additional components and suitably configured processing logic to support known or conventional operating features that are not described in detail herein. The components (1402, 1404, 1406, 1408, and 1402) are communicatively coupled via a local interface 1412. The local interface 1412 can be, for example but not limited to, one or more buses or other wired or wireless connections, as is known in the art. The local interface 1412 can have additional elements, which are omitted for simplicity, such as controllers, buffers (caches), drivers, repeaters, and receivers, among many others, to enable communications. Further, the local interface 1412 may include address, control, and/or data connections to enable appropriate communications among the aforementioned components.

The processor 1402 is a hardware device for executing software instructions. The processor 1402 can be any custom made or commercially available processor, a central processing unit (CPU), an auxiliary processor among several processors associated with the end device 1400, a semiconductor-based microprocessor (in the form of a microchip or chip set), or generally any device for executing software instructions. When the end device 1400 is in operation, the processor 1402 is configured to execute software stored within the memory 1410, to communicate data to and from the memory 1410, and to generally control operations of the end device 1400 pursuant to the software instructions. In an exemplary embodiment, the processor 1402 may include a mobile optimized processor such as optimized for power consumption and mobile applications. The I/O interfaces 1404 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 1404 can also include, for example, a serial port, a parallel port, a small computer system interface (SCSI), an infrared (IR) interface, a radio frequency (RF) interface, a universal serial bus (USB) interface, and the like. The I/O interfaces 1404 can include a graphical user interface (GUI) that enables a user to interact with the end device 1400.

The radio 1406 enables wireless communication to an external access device or network. Any number of suitable wireless data communication protocols, techniques, or methodologies can be supported by the radio 1406, including, without limitation: RF; P25; TETRA; IrDA (infrared); BLUETOOTH; ZIGBEE (and other variants of the IEEE 802.15 protocol); IEEE 802.11 (any variation); IEEE 802.16 (WIMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 1408 may be used to store data. The data store 1408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 1408 may incorporate electronic, magnetic, optical, and/or other types of storage media.

The memory 1410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 1410 may incorporate electronic, magnetic, optical, and/or other types of storage media. Note that the memory 1410 may have a distributed architecture, where various components are situated remotely from one another, but can be accessed by the processor 1402. The software in memory 1410 can include one or more software programs, each of which includes an ordered listing of executable instructions for implementing logical functions. In the example of FIG. 14, the software in the memory 1410 includes a suitable operating system (O/S) 1414 and programs 1416. The operating system 1414 essentially controls the execution of other computer programs, and provides scheduling, input-output control, file and data management, memory management, and communication control and related services. The programs 1416 may include various applications, add-ons, etc. configured to provide end user functionality with the end device 1400. The one or more programs 1416 may be configured to implement the various processes, algorithms, methods, techniques, etc. described herein, such as including but not limited to the processing steps and message transmissions and receptions as set forth in FIGS. 2, 3A-3B, 4A-4B, 5A-5B, 6-8, 9A-9B, 10A-10B, 11A-11B, and 12A-12B.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for application controlled network selection between a broadband network and a narrowband network, the method comprising:
   operating, by a source device, an application that communicates with an end device through a narrowband connection;
   acquiring, by the source device, a source broadband connection comprising a source broadband network address;
   establishing, by the source device, a peer-to-peer broadband connection with the end device using the narrowband connection to communicate the source broadband network address to the end device;
   using, by the source device, the established peer-to-peer broadband connection for communicating data associated with the application to the end device;
   after the peer-to-peer broadband connection is established, maintaining, by the source device, the narrowband connection for a duration of the peer-to-peer broadband connection and managing, by the source device, the established peer-to-peer broadband connection using the narrowband connection as a control channel for the peer-to-peer broadband connection;
   creating a tunnel over the established peer-to-peer broadband connection; and
   transferring, by the source device, the data with an address from the narrowband connection encapsulated in the tunnel over the established peer-to-peer broadband connection.

2. The method of claim 1, wherein the narrowband connection comprises one of Digital Mobile Radio (DMR), Land Mobile Radio (LMR), Project 25 (P25), or Terrestrial Trunked Radio (TETRA), and the source broadband connection comprises one of WI-FI, BLUETOOTH, WIMAX, 3G, or Long Term Evolution (LTE).

3. The method of claim 1, further comprising:
utilizing, by the source device, the narrowband connection for the data associated with the application responsive to unsuccessful negotiating.

4. The method of claim 1, further comprising:
operating, by the source device, a plurality of applications comprising the application; and
utilizing, by the source device, one of the narrowband connection and the established peer-to-peer broadband connection based on a priority level on a per application basis.

5. The method of claim 1, wherein the managing comprises:
receiving, by the source device, a notification from the end device on the narrowband network if the peer-to-peer broadband connection becomes unavailable at the end device;
providing, by the source device, a notification to the end device on the narrowband network if the source broadband connection becomes unavailable; and
using, by the source device, the narrowband connection for the data associated with the application responsive to the receiving or the providing.

6. The method of claim 5, wherein the managing further comprises:
determining, by the source device, the established peer-to-peer broadband connection is available subsequent to the using the narrowband connection; and
using, by the source device, the established peer-to-peer broadband connection for the data associated with the application.

7. The method of claim 1, further comprising:
performing a firewall traversal on the established peer-to-peer broadband connection.

8. The method of claim 1, further comprising:
providing, by the source device, the source broadband network address to a presence notifier server; and
obtaining, by the source device, a target broadband network address of the end device from the presence notifier server.

9. The method of claim 8, further comprising:
utilizing the presence notifier server to form the peer-to-peer broadband connection.

10. A method for application controlled network selection between a broadband network and a narrowband network, the method comprising:
operating, by a source device, an application that communicates with an end device through a narrowband connection;
acquiring, by the source device, a source broadband connection comprising a source broadband network address;
establishing, by the source device, a peer-to-peer broadband connection with the end device using the narrowband connection to communicate the source broadband network address to the end device;
using, by the source device, the established peer-to-peer broadband connection for communicating data associated with the application to the end device;
after the peer-to-peer broadband connection is established, maintaining, by the source device, the narrowband connection for a duration of the peer-to-peer broadband connection and managing, by the source device, the established peer-to-peer broadband connection using the narrowband connection as a control channel for the peer-to-peer broadband connection;
providing, by the source device, the source broadband network address to the end device via the narrowband connection;
requesting, by the source device, a status of a target broadband connection for the end device;
receiving, by the source device, a target broadband network address of the end device if the end device has the target broadband connection enabled;
providing, by the source device, an update to the end device responsive to a change in the source broadband network address; and
receiving, by the source device, an update from the end device responsive to a change in the target broadband network address.

11. A method for application controlled network selection between a broadband network and a narrowband network, the method comprising:
operating, by a source device, an application that communicates with an end device through a narrowband connection;
acquiring, by the source device, a source broadband connection comprising a source broadband network address;
establishing, by the source device, a peer-to-peer broadband connection with the end device using the narrowband connection to communicate the source broadband network address to the end device;
using, by the source device, the established peer-to-peer broadband connection for communicating data associated with the application to the end device;
after the peer-to-peer broadband connection is established, maintaining, by the source device, the narrowband connection for a duration of the peer-to-peer broadband connection and managing, by the source device, the established peer-to-peer broadband connection using the narrowband connection as a control channel for the peer-to-peer broadband connection; and
closing, by the source device, the established peer-to-peer broadband connection responsive to one of a timeout or a message from the end device on the narrowband network.

* * * * *